United States Patent
Nagase et al.

(10) Patent No.: US 9,571,823 B2
(45) Date of Patent: *Feb. 14, 2017

(54) IMAGE DISPLAY APPARATUS AND METHOD

(71) Applicant: Mitsubishi Electric Corporation, Tokyo (JP)

(72) Inventors: Akihiro Nagase, Tokyo (JP); Takahiko Yamamuro, Tokyo (JP); Kouji Okazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 389 days.

This patent is subject to a terminal disclaimer.

(21) Appl. No.: 14/257,498

(22) Filed: Apr. 21, 2014

(65) Prior Publication Data

US 2014/0225986 A1  Aug. 14, 2014

Related U.S. Application Data

(62) Division of application No. 13/620,100, filed on Sep. 14, 2012, now Pat. No. 8,817,083, which is a division
(Continued)

(30) Foreign Application Priority Data

Aug. 7, 2008  (JP) ................................ 2008-204110
Jun. 5, 2009  (JP) ................................ 2009-135861

(51) Int. Cl.
*H04N 13/04* (2006.01)
*G09G 3/00* (2006.01)
(Continued)

(52) U.S. Cl.
CPC ...... *H04N 13/0429* (2013.01); *G02B 27/2264* (2013.01); *G09G 3/003* (2013.01);
(Continued)

(58) Field of Classification Search
CPC ...... G09G 3/003; G09G 3/3406; G09G 3/342; H04N 13/0003; H04N 13/004; H04N 13/0431; H04N 13/0454; H04N 13/0029; H04N 13/0429; H04N 13/0438
See application file for complete search history.

(56) References Cited

U.S. PATENT DOCUMENTS 5,471,237 A   11/1995  Shipp
5,539,423 A   7/1996   Kim et al.
(Continued)

FOREIGN PATENT DOCUMENTS

JP  2007-531473  11/2007
WO  WO 2005/099276 A1  10/2005

*Primary Examiner* — Ramy M Osman
(74) *Attorney, Agent, or Firm* — Birch, Stewart, Kolasch & Birch, LLP

(57) ABSTRACT

A 3D video system is disclosed. The 3D video system includes a frame rate converter that stores an input video signal in a rate conversion frame memory included in the frame rate converter, then reads and outputs the input video signal at a doubled clock rate, a signal format converter that converts a pixel sequence of the video signal output from the frame rate converter and outputs the converted video signal, a controller that outputs a timing signal based on the converted video signal, 3D glasses that transmit light alternately to left and right eyes, and switch the transmission of the light to the left and right eyes, based on the converted video signal and the outputted timing signal, and a spatial modulator that spatially modulates light emitted from a light source, based on the converted video signal. The 3D video system enables the modulated light to be viewed stereoscopically.

11 Claims, 22 Drawing Sheets

Related U.S. Application Data of application No. 12/536,665, filed on Aug. 6, 2009, now Pat. No. 8,310,528.

(51) Int. Cl.
    *G09G 3/34*     (2006.01)
    *H04N 13/00*     (2006.01)
    *G02B 27/22*     (2006.01)
    *H04N 7/01*     (2006.01)

(52) U.S. Cl.
    CPC ......... *G09G 3/3406* (2013.01); *H04N 7/0132* (2013.01); *H04N 13/0003* (2013.01); *H04N 13/004* (2013.01); *H04N 13/0029* (2013.01); *H04N 13/0048* (2013.01); *H04N 13/0051* (2013.01); *H04N 13/0436* (2013.01); *H04N 13/0438* (2013.01); *H04N 13/0497* (2013.01); *G09G 2340/0435* (2013.01)

(56) References Cited

U.S. PATENT DOCUMENTS

| | | |
|---|---|---|
| 5,717,412 A | 2/1998 | Edwards |
| 5,796,373 A | 8/1998 | Ming-Yen |
| 5,808,588 A | 9/1998 | Lin |
| 6,400,394 B1 | 6/2002 | Kim et al. |
| 6,791,752 B2 | 9/2004 | Sedlmayr |
| 6,999,110 B2 | 2/2006 | Kobayashi |
| 7,086,735 B1 | 8/2006 | Provitola |
| 8,294,752 B2 * | 10/2012 | Mihara ............ H04N 13/0438 348/46 |
| 8,416,353 B2 * | 4/2013 | Lin .................... H04N 13/0438 349/15 |
| 8,957,834 B2 * | 2/2015 | Tsai ..................... G09G 3/342 345/6 |
| 2001/0043266 A1 * | 11/2001 | Robinson ........... H04N 13/0438 348/53 |
| 2003/0112507 A1 | 6/2003 | Divelbiss et al. |
| 2007/0008406 A1 * | 1/2007 | Shestak ............. H04N 13/0454 348/58 |
| 2008/0158672 A1 * | 7/2008 | McCosky .......... H04N 13/0431 359/464 |
| 2008/0225187 A1 | 9/2008 | Yamanaka |
| 2009/0002265 A1 * | 1/2009 | Kitaoka ................ G09G 3/003 345/4 |
| 2009/0051759 A1 * | 2/2009 | Adkins ................ G09G 3/003 348/53 |
| 2009/0109282 A1 | 4/2009 | Schnebly et al. |
| 2009/0322858 A1 | 12/2009 | Mitsuya et al. |

* cited by examiner

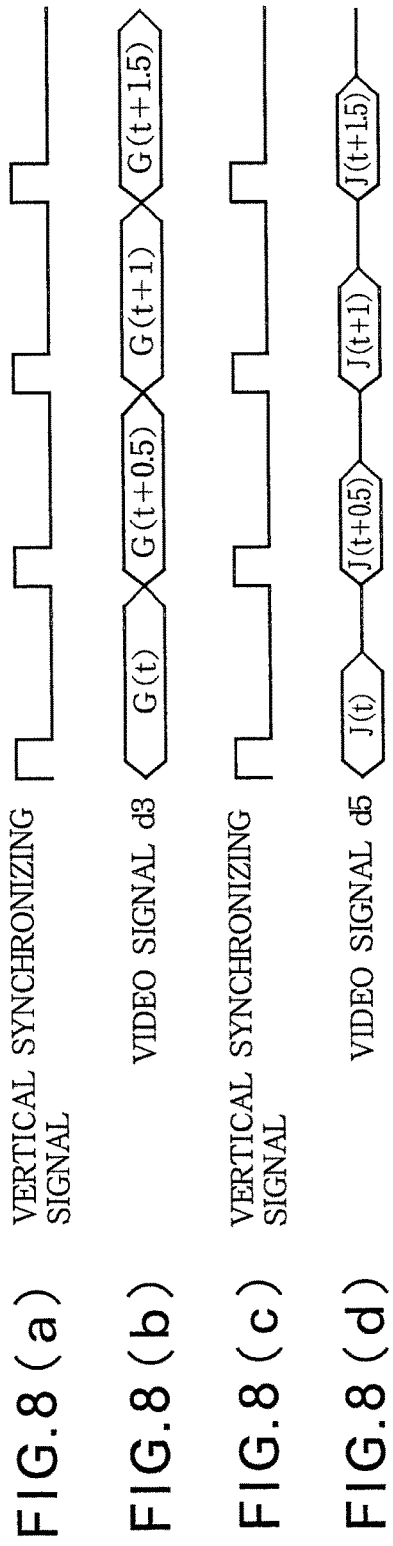

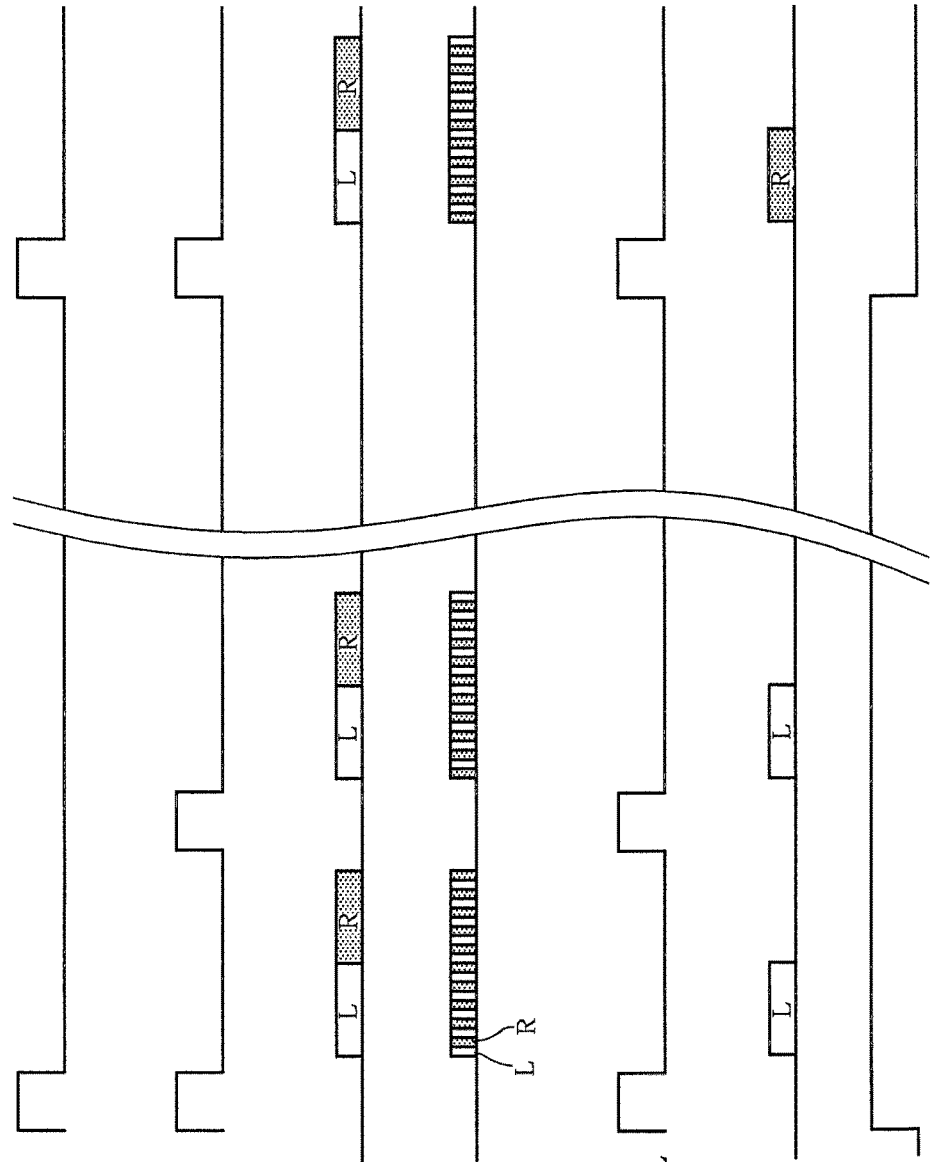

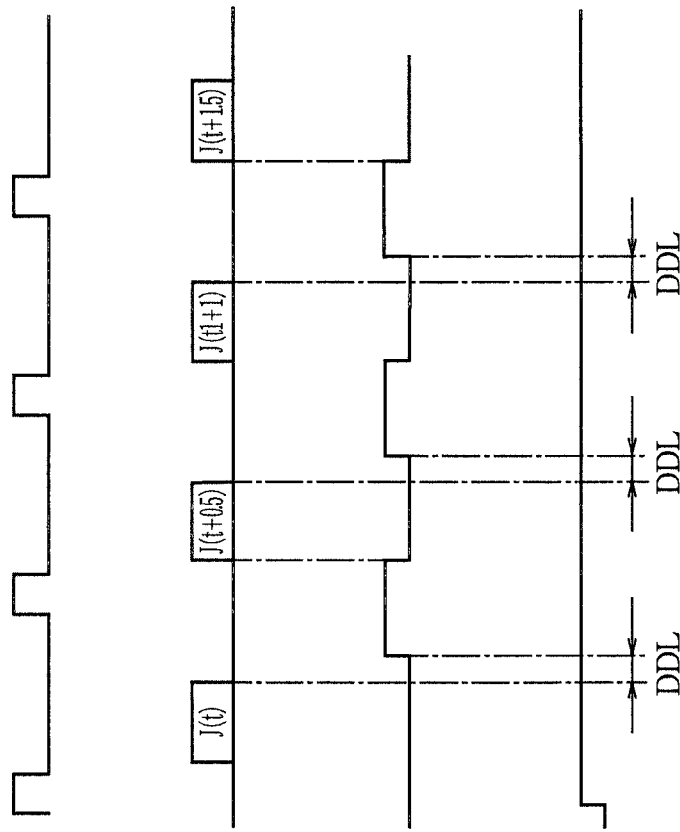

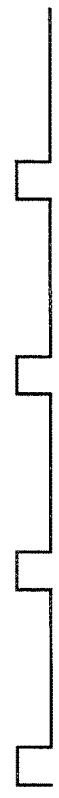
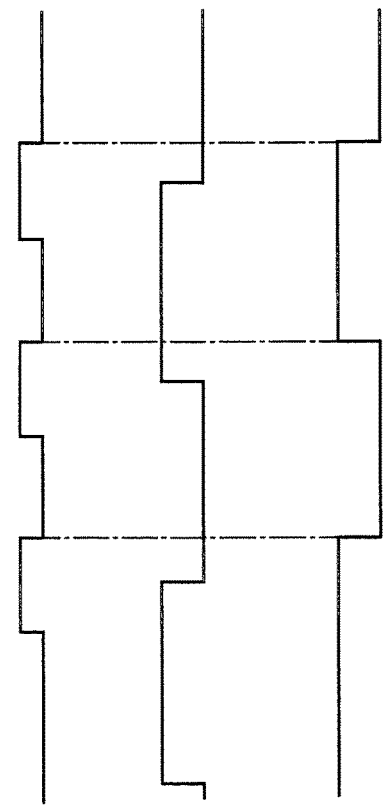
FIG.11(a) VERTICAL SYNCHRONIZING SIGNAL
FIG.11(b) VIDEO SIGNAL d4
FIG.11(c) c1
FIG.11(d) LR
FIG.11(e) c3 d1 d6m (AFTER MASKING)

d4
(SPATIAL MODULATOR
RESOLUTION)

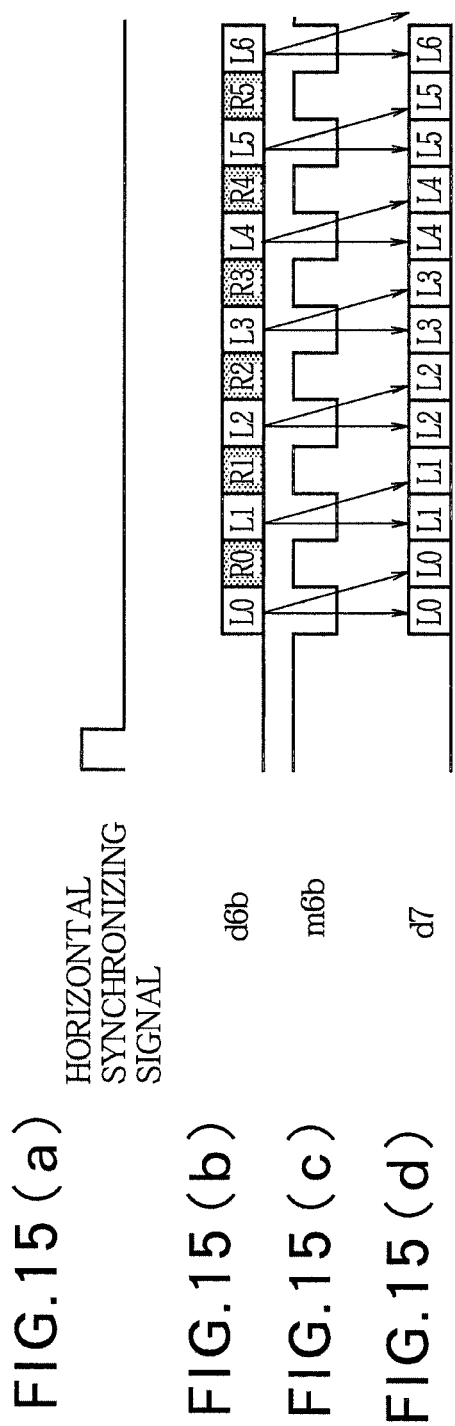

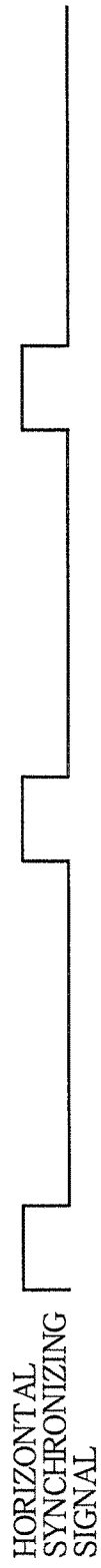
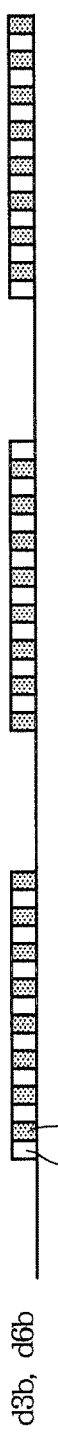
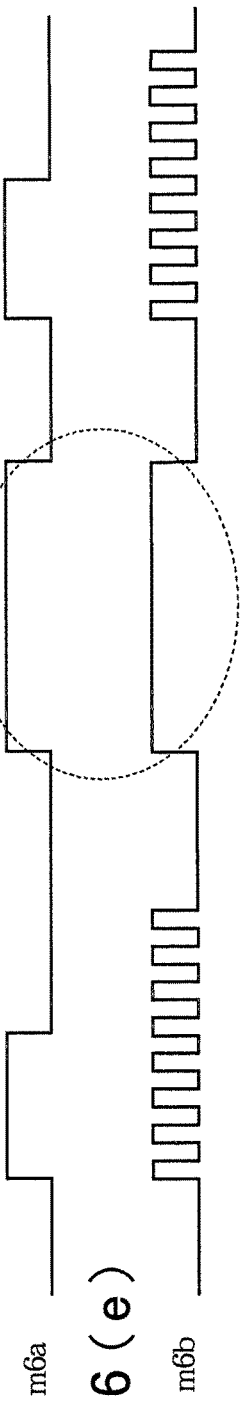

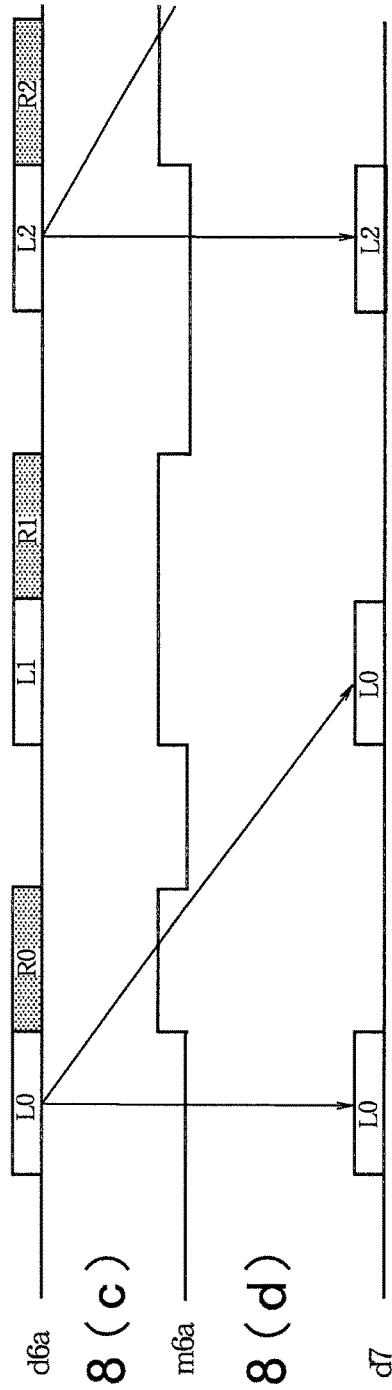

IMAGE DISPLAY APPARATUS AND METHOD

This application is a Divisional of co-pending application Ser. No. 13/620,100 filed on Sep. 14, 2012, which is a Divisional of co-pending application Ser. No. 12/536,665, filed on Aug. 6, 2009, the entire contents of which are hereby incorporated by reference and for which priority is claimed under 35 U.S.C. §120.

BACKGROUND OF THE INVENTION

1. Field of the Invention

The present invention relates to an image display apparatus for spatially modulating light emitted from a light source and displaying the spatially modulated light on a screen, more particularly to an image display apparatus and method that enable a three-dimensional (3D) video signal to be displayed.

2. Description of the Related Art

Recently, the size of the screens of display apparatus has been increasing. Micro device displays, for example, have established a strong presence in the large-screen display market because their structure, in which light emitted from a light source is spatially modulated and projected through a projection lens onto a screen, facilitates increased screen area, and they take advantage of the excellent image display performance of the micro display devices used for spatial modulation, such as digital mirror devices (DMDs), high temperature polysilicon (HTPS) devices, and liquid crystal on silicon (LCOS) devices.

The traditionally popular content displayed on large screens is movies and sports. Recently, however, there has been an increasing need for the display of three-dimensional video (3D video) such as three-dimensional movies and three-dimensional video games.

A known method of displaying three-dimensional video with a micro device display is disclosed in, for example, Japanese Tokuhyo Publication No. 2007-531473 (Published Japanese translation of PCT International Publication WO 2005/099279).

The method described in Japanese Tokuhyo Publication No. 2007-531473 is problematic in that light from the light source is sequentially filtered by a color filter wheel to obtain specific colors and three-dimensional glasses having left and right lenses that transmit light of different wavelengths are used to view the spatially modulated light, so the amount of light entering the observer's eyes is cut in half in comparison with the amount emitted from the light source; consequently, the picture is darkened.

In this method, the input video signal is separated into sub-frames for left-eye and right-eye images and the sub-frames are displayed sequentially. With this method, however, if the input video signal has the generally used rate of 60 Hz, the micro display device must switch and display the left-eye and right-eye images at a rate of at least 120 Hz. Since the response speeds of liquid crystal devices such as HTPS and LCOS devices are low, if the left-eye and right-eye images are switched at a high speed for 3D display, there is a possibility that residual images of a frame previously displayed may be seen, that is, crosstalk may occur.

The video signal displayed on the display has generally undergone picture quality enhancement processing, such as noise processing and edge enhancement, in order to compensate for noise arising in the signal transmission system and for reduction in resolution due to bandwidth restriction. However, there is a problem in that if the same uniform pixel-to-pixel filtering process as used for a two-dimensional video signal is carried out on a 3D video signal having left-eye and right-eye images in one frame of the input signal, unwanted filtering will be performed across the left and right image data, degrading the quality of the image when displayed as a 3D video picture.

When liquid crystal devices such as HTPS and LCOS devices are employed, overdrive processing is indispensable to improve motion response. There is also a problem in that when a video signal with a frame rate doubled due to sub-frame separation for three-dimensional display undergoes overdrive processing, a large bus bandwidth is required for frame memory access, increasing the cost.

SUMMARY OF THE INVENTION

An image display apparatus according to the present invention includes a frame rate converter having a rate conversion frame memory and configured to store an input video signal in the rate conversion frame memory, then read and output the input video signal at a doubled clock rate;

a signal format converter configured to convert a pixel sequence of the video signal output from the frame rate converter and output the converted video signal;

a light source controller configured to output a light source control signal for turning a light source used for image display on and off and a timing signal for controlling 3D glasses, based on the video signal output from the signal format converter;

a 3D glasses controller configured to generate a glasses control signal that, in 3D glasses that transmit light alternately to left and right eyes, switches the transmission of the light to the left and right eyes, based on the video signal output from the signal format converter and the timing signal output from the light source controller; and a spatial modulator configured to spatially modulate light emitted from the light source, based on the video signal output from the signal format converter; wherein when the input video signal is a 3D video signal, the image display apparatus enables the light that has been modulated in the spatial modulator to be viewed stereoscopically by use of the 3D glasses.

According to the present invention, the crosstalk and picture darkening attributable to device response speed in conventional 3D video can be avoided.

BRIEF DESCRIPTION OF THE DRAWINGS

In the attached drawings:

FIGS. 8(*a*) to 8(*d*) illustrate signals input to and output from the frame memory controller 24 in FIG. 7 during 3D-mode processing;

FIGS. 9(a) to 9(g) illustrate signals input to and output from the frame memory controller 24 in FIG. 7 in the first embodiment;

FIGS. 10(a) to 10(d) illustrate the operation of the light source controller 7 in FIG. 1;

FIGS. 11(a) to 11(e) illustrate the operation of the 3D glasses controller 8 in FIG. 1;

FIGS. 15(a) to 15(d) illustrate the operation of the frame memory controller in the third embodiment of the invention;

FIGS. 16(a) to 16(e) illustrate the operation of the masking section in a fourth embodiment of the invention;

FIGS. 18(a) to 18(d) illustrate the operation of the frame memory controller in the fourth embodiment;

DETAILED DESCRIPTION OF THE INVENTION

First Embodiment

Figure 1:
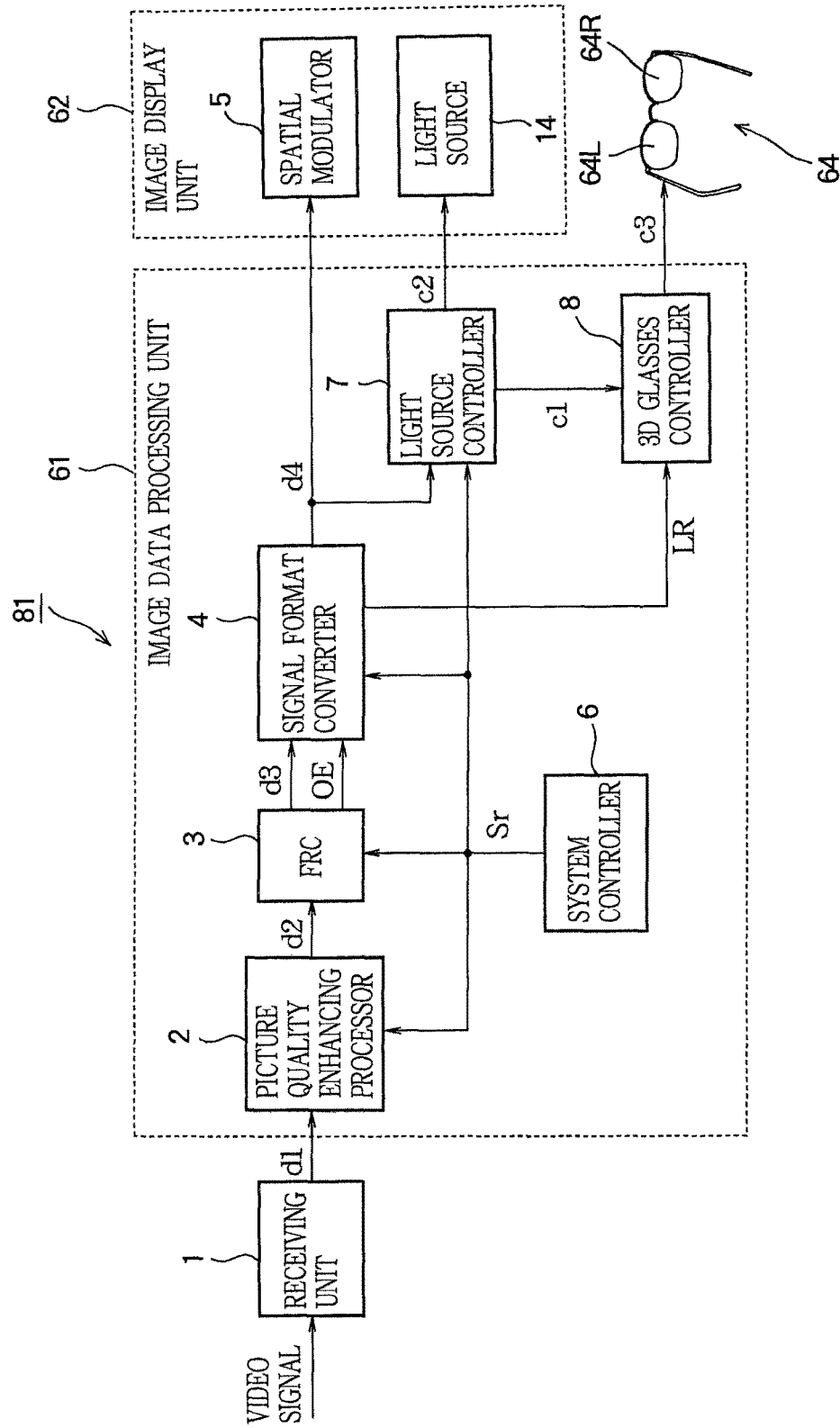
FIG. 1 is a block diagram illustrating an image display apparatus according to a first embodiment of the invention.

FIG. 1 is a block diagram illustrating the structure of the image display apparatus in the first embodiment of the invention. The image display apparatus 81 includes a receiving unit 1, an image data processing unit 61, and an image display unit 62.

The video signal input to the image display apparatus 81 is input to the receiving unit 1. If a composite video signal is input to the image display apparatus 81, for example, the receiving unit 1 samples the input video signal on a clock signal with a predetermined frequency, separates the luminance signal component from the chrominance signal components, and then outputs a video signal d1 including synchronizing signals, and effective image interval signal, image data signals, and other signals to the image data processing unit 61.

The image data processing unit 61 comprises a picture quality enhancing processor 2, a frame rate converter (FRC) 3, a signal format converter 4, a system controller 6, a light source controller 7, and a 3D glasses controller 8. The system controller 6 comprises, for example, a microcontroller.

The picture quality enhancing processor 2 performs so-called picture quality enhancement processing, such as edge enhancement and color correction, on the video signal d1 output from the receiving unit 1, based on control information Sr sent from the system controller 6, and outputs the video signal d2.

The video signal d2 output from the picture quality enhancing processor 2 is input to the FRC 3. The FRC 3 converts the frame rate of the video signal d2 on the basis of the control information Sr sent from the system controller 6 and outputs a video signal d3 to the signal format converter 4.

The FRC 3 also generates, and outputs to the signal format converter 4, a sub-frame flag OE.

The signal format converter 4 converts the pixel sequence of the input video signal d3 on the basis of the control information Sr sent from the system controller 6 and the video signal d3 and sub-frame flag OE input from the FRC 3, outputs a resulting video signal d4 to the image display unit 62 and the light source controller 7, also generates a selection control signal LR from the sub-frame flag OE input from the FRC 3, and outputs the selection control signal LR to the 3D glasses controller 8.

On the basis of the video signal d4 output from the signal format converter 4 and the control information Sr sent from the system controller 6, the light source controller 7 generates a light source control signal c2 for turning a light source used for image display on and off and outputs the light source control signal c2 to the image display unit 62. The light source controller 7 also generates a timing signal c1, based on the timing at which the light source is turned on and off, and outputs the timing signal c1 to the 3D glasses controller 8.

On the basis of the selection control signal LR output from the signal format converter 4 and the timing signal c1 output from the light source controller 7, the 3D glasses controller 8 generates a 3D glasses control signal c3 to control the shutters of 3D glasses 64. Specifically, the 3D glasses controller 8 controls separate transmissive liquid crystal shutters 64R, 64L built into the 3D glasses 64 for the right and left eyes so as to switch the transmission of light to the right eye only or to the left eye only.

The image display unit 62 includes a spatial modulator 5 and a light source 14.

Figure 2:
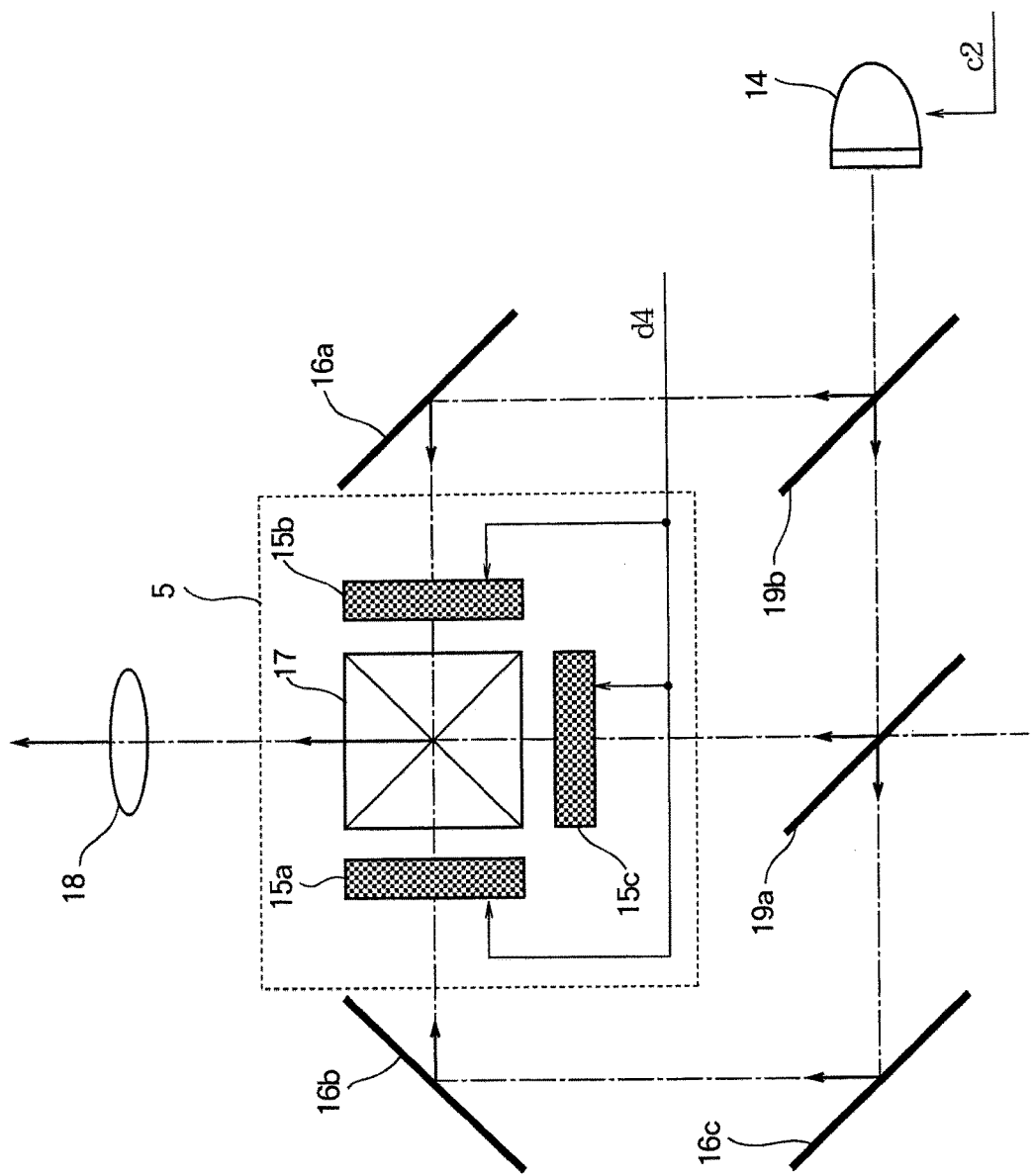
FIG. 2 is a drawing showing an example of the image display unit 62 in FIG. 1.

FIG. 2 shows an example of the image display unit 62. The light output from the light source 14 is guided by mirrors 16a, 16b and dichroic mirrors 19a, 19b, 19c to the spatial modulator 5, where the light is spatially modulated and projected through a projection lens 18 onto a screen (not shown).

The light source 14 emits light according to the light source control signal c2 output from the image data processing unit 61. Specifically, a light source that emits white light is used as the light source 14.

The spatial modulator 5 has three liquid crystal panels 15a, 15b, 15c and a dichroic prism 17. The white light output from the light source 14 is separated by passing through the dichroic mirrors 19a, 19b, 19c. The separated light is guided by the mirrors 16a, 16b and other components so that red light is brought to liquid crystal panel 15a, green light to liquid crystal panel 15b, and blue light to liquid crystal panel 15c.

Based on the video signal d4 output from the image data processing unit 61, the liquid crystal panels 15a, 15b, 15c spatially modulate the red, green, and blue light obtained by separating the light emitted from the light source 14.

The light spatially modulated by the liquid crystal panels 15a, 15b, 15c is combined by the dichroic prism 17 into a single beam, which is projected onto the screen (not shown) through the projection lens 18.

In the above description, an example has been shown in which the light from the light source is separated into three colors by using dichroic mirrors, but the separation of the light is not limited to three colors.

Also, in the light source 14, a shutter may be used to control the turning of the light source on and off. In this case, the light source is left always turned on, and a shutter disposed in front of the light source is closed and opened according to the light source control signal c2, thereby controlling the amount of light directed onto the dichroic mirrors 19a, 19b, 19c.

An alternative structure may be contemplated in which a separate light source 14 is provided for each of the liquid crystal panels and the dichroic mirrors 19a, 19b, 19c are not used. Specifically, for example, semiconductor lasers or LEDs emitting red, green, and blue light toward the corresponding liquid crystal panels may be used as light sources.

In the example described above an HTPS device is used as the spatial modulator 5, but the same effect can be obtained if an LCOS device or a DMD is used.

Furthermore, in the present embodiment, an example has been described in which a micro device display projects spatially modulated light onto a screen through a projection lens, but the invention is also easily applicable to, for example, a liquid crystal display of the direct view type.

Next, the operation of the image data processing unit 61 will be described in detail.

The video signal d1 output from the receiving unit 1 is input to the picture quality enhancing processor 2. The picture quality enhancing processor 2 performs filtering processing for enhancing picture quality, such as edge enhancement and color correction, on the video signal d1 on the basis of control information Sr sent from the system controller 6, and outputs the video signal d2.

If the video signal d1 output from the receiving unit 1 is a 3D video signal, generally a right image and a left image coexist (both images are included) in a single frame.

Since the right image and the left image included in the 3D video signal are independent images, performing overlapped filtering on these images (treating them as one set of date) leads to degradation of picture quality. Specifically, if edge enhancement is performed using, for example, a Laplacian filter or the like and both right and left images are present, a false enhancement component is added to pixels other than edge pixels, creating visible noise. Therefore, the picture quality enhancing processor 2 determines the format of the 3D video signal on the basis of the control information Sr sent from the system controller 6, separates the pixels constituting the right image from the pixels constituting the left image in the same frame, and performs filtering on them separately.

The video signal d2 output from the picture quality enhancing processor 2 is input to the FRC 3.

Figure 3:
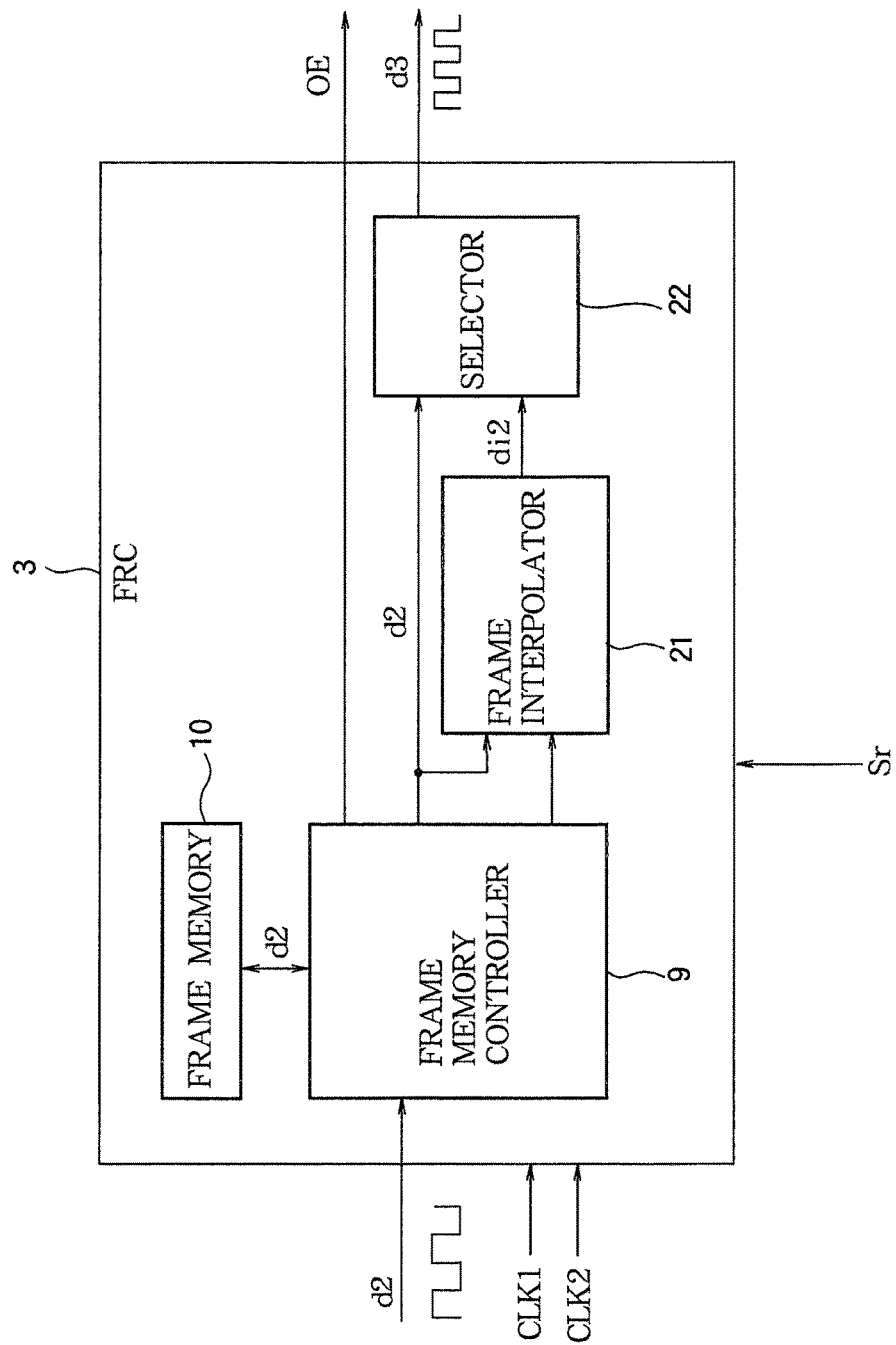
FIG. 3 is a block diagram showing an example of the FRC 3 in FIG. 1.

FIG. 3 is a block diagram showing details of the FRC 3.

The FRC 3 comprises a frame memory controller 9, a frame memory (rate conversion frame memory) 10, a frame interpolator 21, and a selector 22.

The frame memory controller 9 writes video signal d2 into the frame memory 10 according to memory addresses generated on the basis of the synchronizing signals included in the input video signal d2.

The frame memory controller 9 also reads the video signal stored in the frame memory 10. The addresses designating the memory locations from which the video signal is to be read may or may not be generated in synchronization with the synchronizing signals included in video signal d2. They are however generated with a read clock CLK2 having a frequency twice as large as that of a write clock CLK1.

The frame interpolator 21 generates and outputs an interpolated frame video signal di2, based on the video signals of a plurality of frames output from the frame memory controller 9. On the basis of the control signal Sr sent from the system controller 6, the selector 22 alternately selects the video signal d2 output from the frame memory controller 9 and the video signal di2 output from the frame interpolator 21, and outputs it as video signal d3.

The frame memory controller 9 also determines whether the output video is a sub-frame or not and outputs the sub-frame flag OE. The term 'sub-frame' here means a frame that, when the frame rate is doubled, starts at a vertical synchronizing signal inserted between the original vertical synchronizing signals.

Figure 4:
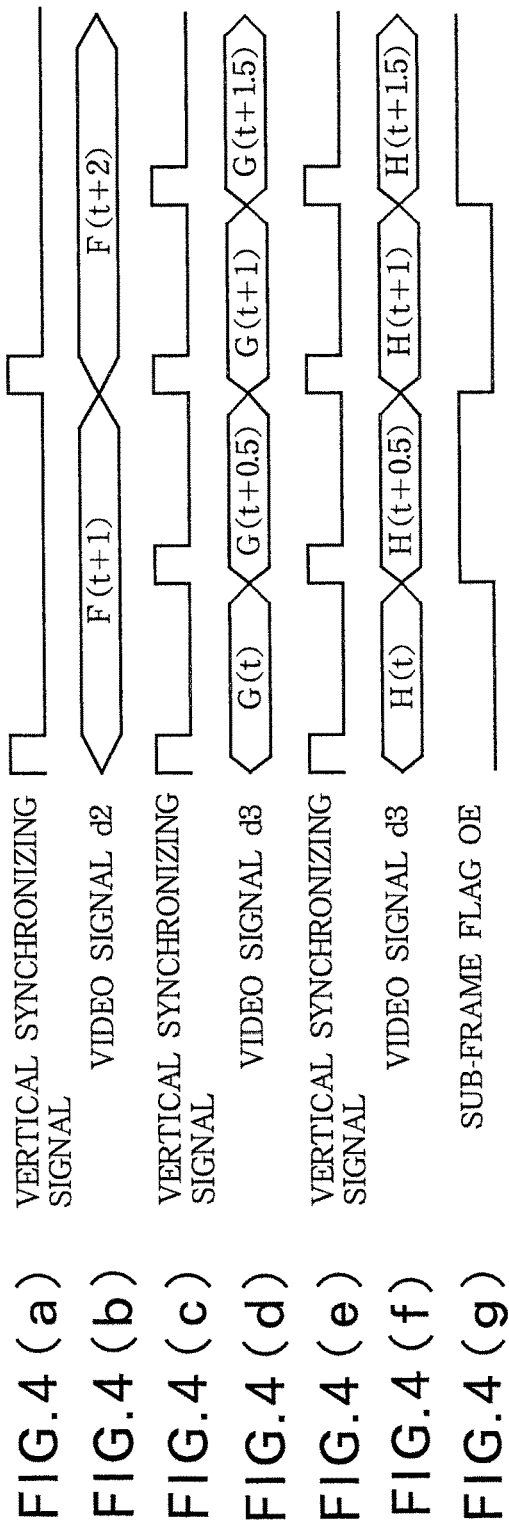
FIGS. 4(*a*) to 4(*g*) illustrate signals associated with the FRC 3 in FIG. 1.

FIGS. 4(a) to 4(g) illustrate the relationship among the video signal d2 input to the FRC 3, the video signal d3 output from the FRC 3, and the sub-frame flag OE. FIG. 4(b) shows the video signal d2 input to the FRC 3. FIG. 4(a) shows the vertical synchronizing signal of video signal d2. (The synchronizing signal is actually combined with the video signal, but is shown separately for convenience. Other synchronizing signals in the present application will be shown likewise.) FIG. 4(d) shows the video signal d3 output from the FRC 3 in 3D mode. FIG. 4(c) shows the vertical synchronizing signal of video signal d3, FIG. 4(f) shows the video signal d3 output from the FRC 3 in a normal display (2D display), FIG. 4(e) shows the vertical synchronizing signal of video signal d3, and FIG. 4(g) shows the sub-frame flag OE.

The video signal d3 output from the FRC 3 (FIGS. 4(d) and 4(f)) has twice the frame rate of the input video signal d2 (FIG. 4(b)). Specifically, if the input video signal d2 is, for example, a 60-Hz signal, it is converted to a signal with the doubled rate of 120 Hz for output as the video signal d3 output from the FRC 3, as shown in FIGS. 4(d) and 4(f).

The sub-frame flag OE shown in FIG. 4(g) is a signal toggled at every frame of the output image, and is shown here, as an example, as a signal that goes Hi when the output image is a sub-frame.

Figure 5:
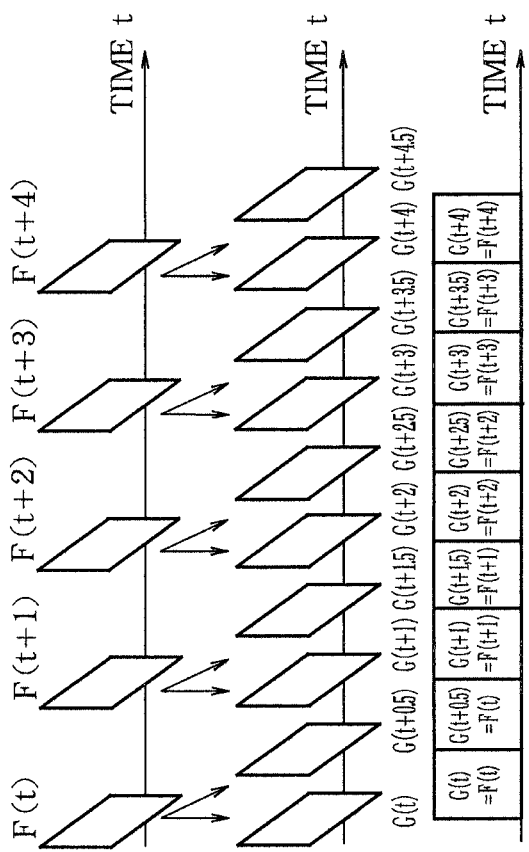
FIGS. 5(*a*) to 5(*c*) illustrate the operation of the FRC 3 in FIG. 1 during 3D-mode processing.

FIGS. 5(a) to 5(c) illustrate the relationship between the video signal d2 input to the FRC 3 (FIG. 5(a)) and the video signal d3 output after frame rate conversion (FIG. 5(b), FIG. 5(c)) when 3D mode processing is specified by the control information Sr sent from the system controller 6.

During 3D mode processing, the frame memory controller 9 reads the video image of frame F(t) of the input video signal d2 from the frame memory 10 as video image of frame G(t) of the video signal d3 (FIG. 4(d)) to be output after frame rate conversion, and outputs it to the selector 22.

In addition, the frame memory controller 9 also reads the video image of frame F(t) from the frame memory 10 as the video image of frame G(t+0.5) of the video signal d3 to be output after frame rate conversion, G(t+0.5) being the next frame after frame G(t), and outputs it to the selector 22.

During 3D mode processing, the selector 22 selects the video signal d2 output from the frame memory controller 9. This allows the same video signal to be output repeatedly over two frames as the output image signal d3 and the video content to be changed every two frames.

When normal 2D mode processing (non-3D mode) is specified by the control information Sr sent from the system controller 6, the video signals of a plurality of frames read from the frame memory 10 under the control of the frame memory controller 9 are input to the frame interpolator 21.

The frame interpolator 21 generates the video signal di2 of an intermediate frame, based on the information included in the video signals of the plurality of input frames.

Figure 6:
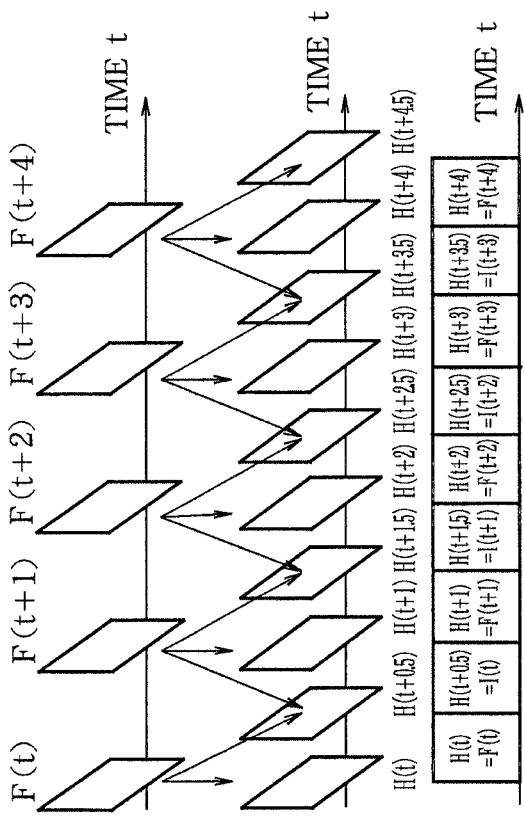
FIGS. 6(*a*) to 6(*c*) illustrate the operation of the FRC 3 in FIG. 1 during normal processing.

FIGS. 6(a) to 6(c) illustrate the relationship between the video signal d2 input to the FRC 3 when normal processing (non-3D mode) is specified (FIG. 6(a)) and the video signal d3 output after frame rate conversion (FIGS. 6(b) to 6(c)).

The video image in frame F(t) in video signal d2 is output in frame H(t) in the output video signal d3 after frame rate conversion.

Differing from when 3D mode processing is specified as shown in FIGS. 5(b) and 5(c), as the H(t+0.5) frame output next after frame H(t), a frame I(t) (intermediate frame) is output that is obtained by performing inter-frame interpolation using frames F(t) and F(t+1).

Inter-frame interpolation is performed using, for example, the following equation.

$$I(t)=\alpha H(t)+(1-\alpha)H(t+1)$$

In the above equation, α is a weighting coefficient for H(t) and H(t+1) and satisfies the condition 0≤α≤1. When α is set to 0.5, interpolation is performed by simple averaging of H(t) and H(t+1) (linear interpolation).

Alternatively, it is also possible to output the same video signal over two frames in normal processing (non-3D mode), just as shown in FIGS. 5(b) and 5(c). From the viewpoint of improving motion picture quality, however, it is preferable to use a signal obtained by frame interpolation processing as shown in FIGS. 6(b) to 6(c).

The video signal d3 output from the FRC 3 is input to the signal format converter 4.

Figure 7:
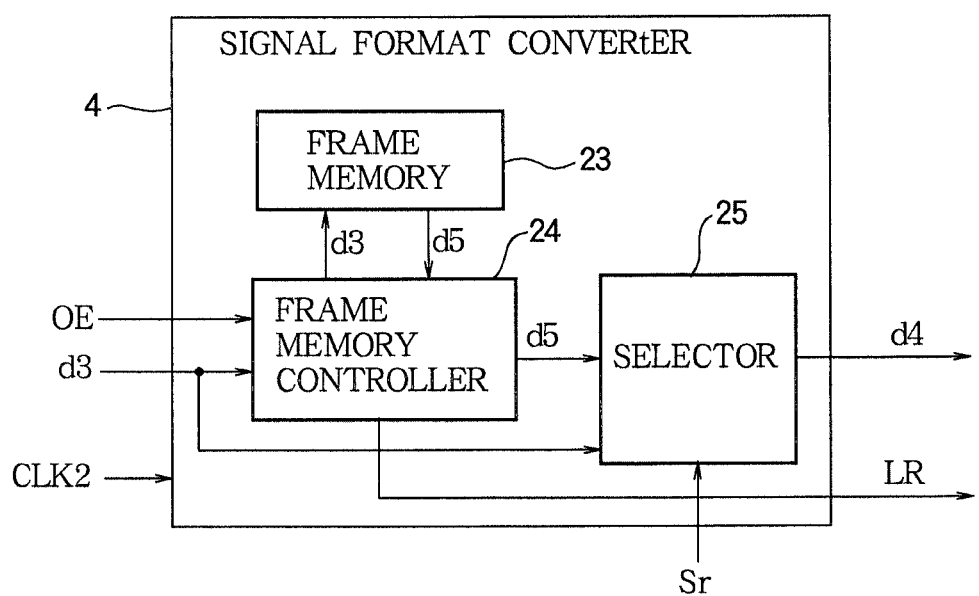
FIG. 7 is a block diagram showing an example of the signal format converter 4 in FIG. 1.

FIG. 7 is a block diagram showing details of the signal format converter 4.

The signal format converter 4 comprises a frame memory controller 24, a frame memory (format conversion frame memory) 23, and a selector 25.

The video signal d3 and sub-frame flag OE output from the FRC 3 are input to the frame memory controller 24. The frame memory controller 24 writes the video signal d3 into the frame memory 23 according to memory addresses generated on the basis of the synchronizing signals included in the input video signal d3.

The frame memory controller 24 also reads the video signal stored in the frame memory 23. When reading, the frame memory controller 24 generates read addresses based on the sub-frame flag OE so as to read only the right image or only the left image from the frame memory 23. Differing from the FRC 3, the frequency of the output video signal d4 is the same as the frequency of the input video signal d3, so the amount of frame memory access required per frame during reading is half that required during writing.

FIGS. 8(a) to 8(d) illustrate relationships during 3D mode processing between video signal d3, which is input to the frame memory controller 24 and then written into the frame memory 23, and video signal d5, which is read from the frame memory 23 and then output from the frame memory controller 24: FIG. 8(b) shows the video signal d3; FIG. 8(a) shows the vertical synchronizing signal of video signal d3; FIG. 8(d) shows video signal d5; FIG. 8(c) shows the vertical synchronizing signal of video signal d5.

When 3D mode processing is specified by the control information Sr sent from the system controller 6, since the output video signal d5 consists of only the right or left image, the amount of output video signal data is half the amount of input video signal data in the input video signal d3.

FIGS. 9(a) to 9(g) show the relationships of the 3D video signal patterns input to the frame memory controller 24 to the output video signal d5 and selection control signal LR: FIGS. 9(c) to 9(d) show video signals d3a and d3b as specific examples of the video signal d3 input to the frame memory controller 24; FIGS. 9(a) and 9(b) show the vertical synchronizing signal and horizontal synchronizing signal of video signals d3a and d3b; FIG. 9(f) shows the video signal d5 output from the frame memory controller 24; FIG. 9(e) shows the horizontal synchronizing signal of video signal d5; FIG. 9(g) shows the selection control signal LR.

The 3D video signal is a video signal in which a right image and a left image are combined. As the video signal d3a shown in FIG. 9(c), for example, the left and right image data are transmitted in the first and second halves of each horizontal period, respectively, so that the left and right halves of the picture match the left and right images, respectively. Alternatively, right and left image data alternate pixel by pixel as in the video signal d3b shown in FIG. 9(d), and the order of the right and left image data within each horizontal line (which data appears first in each line) is changed at every horizontal line.

Since the frame memory controller 24 reads the video signal stored in the frame memory 23 according to the format of the input 3D video signal d3, even if a 3D video signal with different specifications is input, the output 3D video signal has a signal format in which the right and left images appear in alternate frames as shown in FIG. 9(f).

The frame memory controller 24 generates a selection signal LR and outputs it to the 3D glasses controller 8. The selection control signal LR has different values in the periods in which the frame memory controller 24 reads the right image and the periods in which the frame memory controller 24 reads the left image from the frame memory 23.

The video signal d5 output from the frame memory controller 24 is input to the selector 25. When 3D mode processing is specified by the control information Sr sent from the system controller 6, the selector 25 outputs the video signal d5 output from the frame memory controller 24. When normal processing (non-3D mode) is specified, the selector 25 selects the input video signal d3, so the video signal d3 is output directly as video signal d4.

The video signal d4 output from the signal format converter 4 is input to the image display unit 62 and also to the light source controller 7.

On the basis of the video signal d4 output from the signal format converter 4 and the control information Sr sent from the system controller 6, the light source controller 7 outputs the light source control signal c2 for turning the light source used for image display on and off to the image display unit 62.

FIGS. 10(a) to 10(d) illustrate the operation of the light source controller 7, showing the relationship among the input (transmission) of the video signal d4 to the light source controller 7 (FIG. 10(b)), the vertical synchronizing signal of video signal d4 (FIG. 10(a)), and the light source control signal c2 (FIGS. 10(c) and 10(d)).

When normal processing (non-3D mode) is specified by the control information Sr sent from the system controller 6, the light source control signal c2 operates independently of the input video signal d4 and, for example, is always output at the Hi level to the image display unit 62, as shown in FIG. 10(d).

In the image display unit 62, the light source is turned on while the light source control signal c2 is Hi.

When the 3D mode is specified by the control information Sr sent from the system controller 6, the control signal c2 changes in synchronization with video signal d4 as shown in FIG. 10(*c*). Specifically, when a predetermined subsequent delay time DDL has elapsed from the end of the video signal J(t) in each frame, the light source control signal c2 goes Hi to commence the display of the image according to the video signal d4 having been input (transmitted) at the timing shown in FIG. 10(*b*). The light source control signal c2 goes Lo to terminate the display of the image at least by the time the input (transmission) of the video signal d4 of the next frame is started.

The delay time DDL must be longer than the response time of the liquid crystal panels used in the image display unit 62; for example, the delay time may be several milliseconds.

It is thereby possible to eliminate the frame-to-frame video crosstalk due to liquid crystal response speed that occurs when 3D video is displayed.

The light source controller 7 outputs not only the light source control signal c2 to the image display unit 62 but also the timing signal c1 to the 3D glasses controller 8.

The timing signal c1 is equivalent to the light source control signal c2.

FIGS. 11(*a*) to 11(*e*) illustrate the operation of the 3D glasses controller 8.

From the timing signal c1 (FIG. 11(*c*)) and the selection control signal LR (FIG. 11(*d*)), the 3D glasses controller 8 generates the 3D glasses control signal c3 (FIG. 11(*e*)). The value (level) of the 3D glasses control signal c3 changes according to the value (level) of the selection control signal LR at the point in time when the light source of the image display unit 62 is turned off (changes from the turned-on state to the turned-off state).

Since the value of the 3D glasses control signal c3 changes at the timing when the light source is turned off, the left and right liquid crystal shutters of the 3D glasses 64 controlled by the 3D glasses control signal c3 are also switched at the timing when the light source is turned off.

Since the light source, after being turned off, is not turned on during at least the period in which video signal d4 is being sent to the image display unit 62, even if the liquid crystal shutters of the 3D glasses 64 have a slow response speed, the switching of the shutters is completed by the next time the light source is turned on.

As described above, when a 3D video signal is input, the video signal is converted to a doubled frame rate by repeating the same image in two frames, right and left images are generated in alternate frames by format conversion, and the light source and the 3D glasses 64 are controlled in synchronization with the display timing (the period in which the light source control signal c2 in FIG. 10(*c*) is Hi) of the image display unit 62, thereby enabling a 3D video to be displayed without crosstalk.

In addition, when a 3D video signal is input, since the picture quality enhancing processor 2 processes the right and left images separately, the right image information and left image information are not mixed and therefore unwanted noise is not added to the input 3D video signal. As a result, degradation of the 3D display image can be prevented.

Since the signal format converter 4 controls addresses designating the memory locations from which data are read from the frame memory 23 according to the format of the input 3D video signal, any of a plurality of different 3D video signal formats can be displayed in similar fashion.

In the present embodiment, a structure has been described in which edge enhancement and color correction are performed on an input video using the picture quality enhancing processor 2. When, however, the input video signal is, for example, computer graphics, picture quality enhancement processing is not necessarily required, so a structure may be employed in which the video signal d1 output from the receiving unit 1 is directly input to the FRC 3.

Second Embodiment

The overall structure of the image display apparatus in the second embodiment is the same as the structure described in the first embodiment with reference to FIG. 1. The image display apparatus in the second embodiment, however, differs in the structure of the signal format converter 4.

Figure 12:
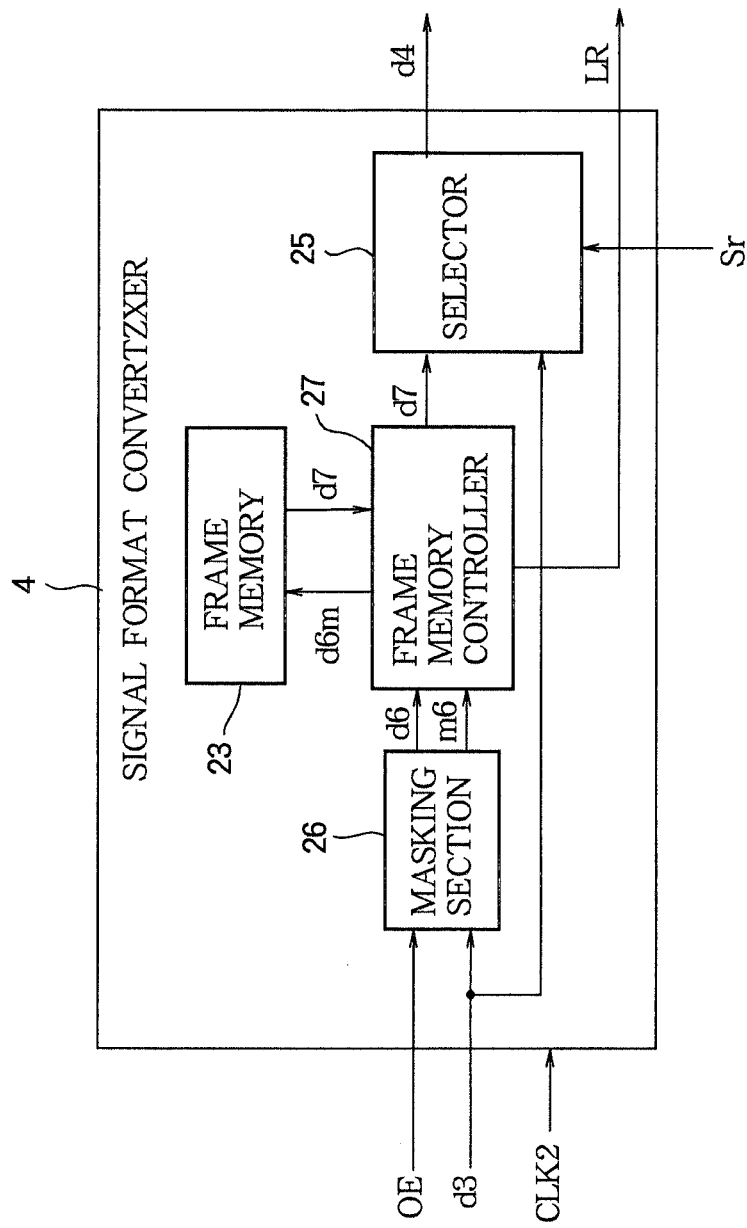
FIG. 12 is a block diagram showing an example of the signal format converter 4 used in a second embodiment of the invention.

FIG. 12 is a block diagram showing details of the signal format converter 4 in the second embodiment. The differences from the signal format converter 4 in FIG. 7 are that a frame memory controller 27 is provided in place of the frame memory controller 24 in FIG. 7 and a masking section 26 is added before the frame memory controller 27.

The video signal d3, with the rate doubled by the FRC 3, is stored into the frame memory 23 in the signal format converter 4. Although the rate depends on the number of bits of the signal, when so-called full high definition (full-HD) video having a resolution of 1920 dots×1080 lines per frame, for example, is input at a rate of 120 Hz, a transfer rate of about 13 Gbps is required.

Even though DRAMs with high access speeds have become widely available, a frame memory having a large bus bandwidth is problematic from the viewpoint of cost.

To solve this problem, the present embodiment uses the masking section 26 to reduce the amount of data written into the frame memory 23.

When the input video signal d3 is a 3D video signal, the masking section 26 generates a mask signal m6 on the basis of the sub-frame flag OE and outputs it to the frame memory controller 27 together with a video signal d6. Based on this mask signal, the frame memory controller 27 reduces the amount of data written into the frame memory 23.

Figure 13:
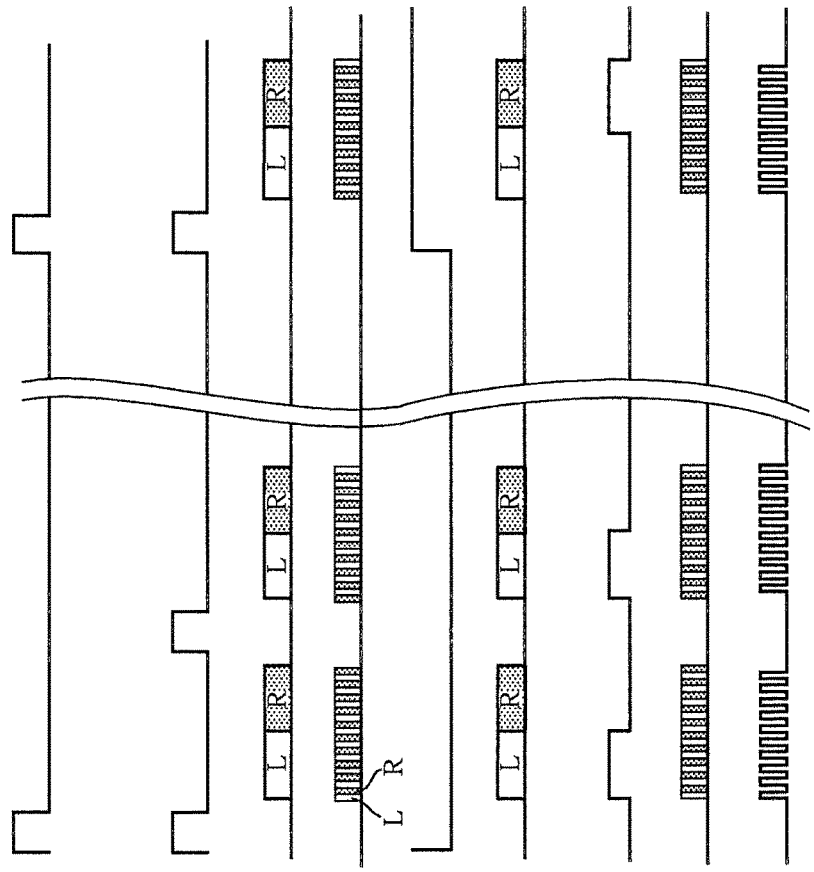
FIGS. 13(a) to 13(i) illustrate the operation of the masking section 26 in FIG. 12.

FIGS. 13(*a*) to 13(*i*) illustrate the operation of the masking section 26: FIGS. 13(*c*) and 13(*d*) show video signals d3*a*, d3*b* as specific examples of the video signal d3 input to the signal format converter 4; FIGS. 13(*a*) and 13(*b*) show the vertical synchronizing signal and horizontal synchronizing signal of video signals d3*a* and d3*b*; FIG. 13(*e*) shows the sub-frame flag OE; FIGS. 13(*f*) and 13(*h*) show video signals d6*a*, d6*b* as specific examples of the video signal d6 output from the masking section 26; FIGS. 13(*g*) and 13(*i*) show mask signals m6*a*, m6*b* as specific examples of the mask signal m6 generated in the masking section 26.

When, as video signal d3*a* shown in FIG. 13(*c*), for example, a video signal is input that includes a left image in a left half and a right image in the right half of the picture, the masking section 26 outputs the video signal d6*a* shown in FIG. 13(*f*) and the mask signal m6*a* shown in FIG. 13(*g*).

The mask signal m6*a* is generated from the sub-frame flag OE (FIG. 13(*e*)): the mask signal m6*a* goes Hi during the right image period in every other frame (i.e., in alternate frames) of video signal d3*a*; in the frames between these every other frames, the mask signal m6*a* goes Hi during the left image periods in video signal d3*a*. That is, the period in which the mask signal m6*a* is Hi alternates frame by frame.

When, as shown in FIG. 13(*d*), a video signal d3*b* is input in which right image data and left image data alternate pixel by pixel, the mask signal m6*b* shown in FIG. 13(*i*) is generated. Similarly to when video signal d3 (FIG. 13(*f*)) is input, the mask signal m6*b* goes Hi during the right image data period in every other frame of video signal d3b and goes Hi during the left image data period in the frames between the every other frames in video signal d3b. That is, the period in which the mask signal m6b is Hi alternates frame by frame.

The mask signal m6 generated in the masking section 26 is output to the frame memory controller 27 together with video signal d6.

The frame memory controller 27 generates memory addresses from the synchronizing signals (FIG. 13(a), FIG. 13(b)) included in its input video signal d6. The memory addresses are generated only, however, while the mask signal m6 is Lo. Thus from each frame of the video signal d6 input to the frame memory controller 27, only the right image data or only the left image data is selected and written into the frame memory 23. The data selected and written will be denoted d6m.

The bus bandwidth needed for writing to the frame memory 23 is thereby halved.

The frame memory controller 27 also reads the video signal stored in the frame memory 23. The frame memory controller 27 sequentially reads the video signal d6m stored in the frame memory 23.

Since only the right image or the left image in each frame is written in the frame memory 23 at the writing stage, the amount of video signal data d7 (=d6m) read from the frame memory 23 and output through the frame memory controller 27 is half the amount in the input video signal d3, as in the video signal d5 shown in FIG. 9(f).

Other structures are the same as described in the first embodiment, so descriptions will be omitted.

As described above, when the signal format converter 4 receives a 3D video signal, a mask signal for masking the right pixels and the left pixels in alternate frames is generated and frame memory write addresses are generated from the mask signal, so it becomes possible to reduce the bus bandwidth required to access the frame memory 23.

Third Embodiment

The overall structure of the image display apparatus in the third embodiment is the same as the structure described in the first embodiment with reference to FIG. 1. The signal format converter 4 in the third embodiment is generally as described in the second embodiment with reference to FIG. 12, but differs in the following respect.

In the second embodiment, when the signal format converter 4 receives a 3D video signal, a mask signal for masking the right pixels and the left pixels in alternate frames is generated and frame memory write addresses are generated from the mask signal. Therefore, the size of the video signal d4 output to the spatial modulator 5 is half the size of the video signal d1 output from the receiving unit 1. The third embodiment is a method that can be used to read and output the data written into the frame memory 23 by using the method described in the second embodiment. The reading method in the third embodiment, however, can also be used to read data written by methods other than the writing method described in the second embodiment.

Figure 14:
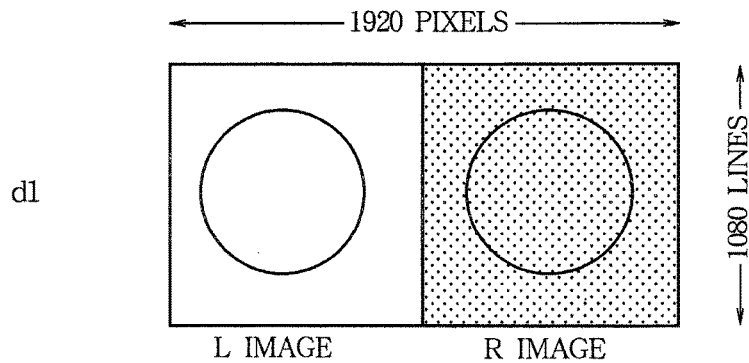
FIGS. 14(a) to 14(c) illustrate changes in image size at different steps during the operation of the second embodiment.
Figure 14:
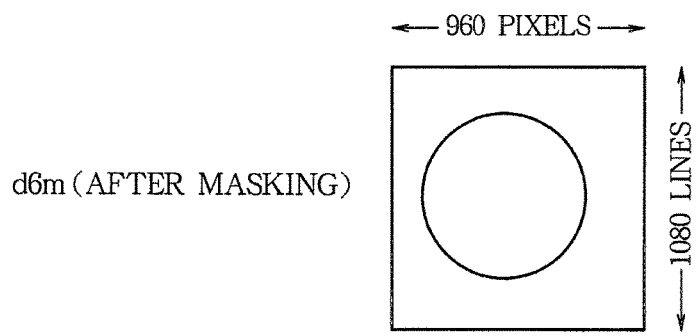
Figure 14:
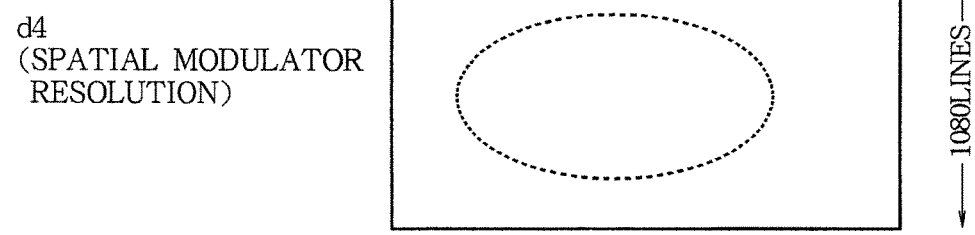

FIGS. 14(a) to 14(c) illustrate changes in image size at different steps in the present system (apparatus of the third embodiment): FIG. 14(a) shows the image size of video signal d1; FIG. 14(b) shows the image size of the video signal d6m after mask processing; FIG. 14(c) shows the image size of the video signal d4 supplied to the image display unit 62, that is, the size (number of pixels) of the spatial modulator 5.

Suppose, for example, that the right and left images of the video signal d1 output from the receiving unit 1 occupy respective halves of a full-HD (1920 dots×1080 lines) area as shown in FIG. 14(a). In this case, as shown in FIG. 14(b), the video signal d6m read from the frame memory 23 in the signal format converter 4 has a size of 960 dots×1080 lines, which is half the size of the video signal d1 output from the receiving unit 1.

When the size (number of pixels) of the spatial modulator 5 is the same as the size of the video signal d1 output from the receiving unit 1 as shown in FIG. 14(c), after video signal d6 is read from the frame memory 23, it is necessary to increase the size of the video signal before supplying it to the spatial modulator 5.

FIGS. 15(a) to 15(d) illustrate the operation of the frame memory controller 27 in the signal format converter 4 according to the third embodiment: FIGS. 15(b) and 15(c) show a video signal d6b as a specific example of the video signal d6 written into the frame memory 23 and a mask signal m6b as a specific example of the mask signal m6 used in writing: FIG. 15(a) shows the horizontal synchronizing signal of video signal d6b; FIG. 15(d) shows the video signal d7 read from the frame memory 23.

A difference from the operation of the frame memory controller 24 shown in FIGS. 9(a) to 9(g) is as follows: when the video signal is read from the frame memory 23, the video signal (image data) of each pixel that is read is used (output from the frame memory controller 27) for two consecutive pixels (using a holding process). The data d7 output from the frame memory controller 27 are as shown in FIG. 15(d).

When the video signal is read from the frame memory 23, one access to the frame memory 23 for every two pixels (clocks) is sufficient, so no increase in bus bandwidth is necessary. In addition, it is not necessary to add an extra line memory and build in a horizontal enlargement circuit.

As described above, in the signal format converter 4, when the video signal stored in the frame memory 23 is read from the frame memory 23, the video signal for each pixel that is read is placed side by side in two consecutive pixels (by performing a holding process), so the bus bandwidth required for frame memory access can be kept down without reducing the size of the input video signal.

Fourth Embodiment

The image display apparatus in the fourth embodiment is generally the same as described in the third embodiment, but differs in the operation of the masking section 26 of the signal format converter 4.

FIGS. 16(a) to 16(e) illustrate the operation of the masking section 26 in the fourth embodiment: FIGS. 16(b) and 16(c) show video signals d3a, d3b as specific examples of the video signal d3 input to the signal format converter 4 and video signals d6a, d6b as examples of the video signal d6 output from the masking section 26; FIG. 16(a) shows the horizontal synchronizing signal of video signals d3a and d3b; FIGS. 16(d) and 16(e) show mask signals m6a, m6b as specific examples of the mask signal m6 output from the masking section 26.

The mask signals m6a, m6b shown in FIGS. 16(d) and 16(e) differ from the mask signals shown in FIGS. 13(g) and 13(i) in that they mask all data in alternate lines (by selecting alternate lines and masking all data in the selected lines). In addition, in lines positioned between the alternate lines (non-selected lines), the left image data and the right image data in the relevant lines are masked alternately at every frame (frame by frame) so that the left image data are masked in every other frame while the right image data are masked in the frames between these every other frames, as in FIGS. 13(g) and 13(i).

Figure 17A:
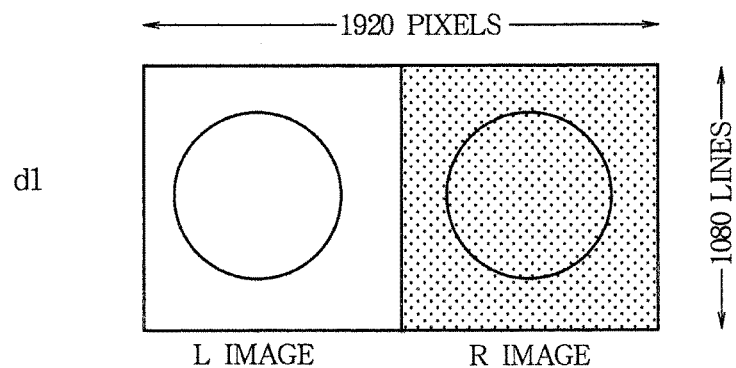
FIGS. 17(a) to 17(c) illustrate changes in image size at different steps during the operation of the fourth embodiment.
Figure 17B:
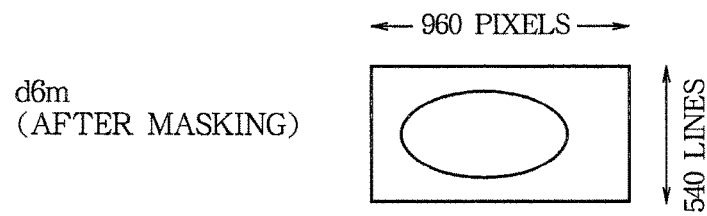
Figure 17C:
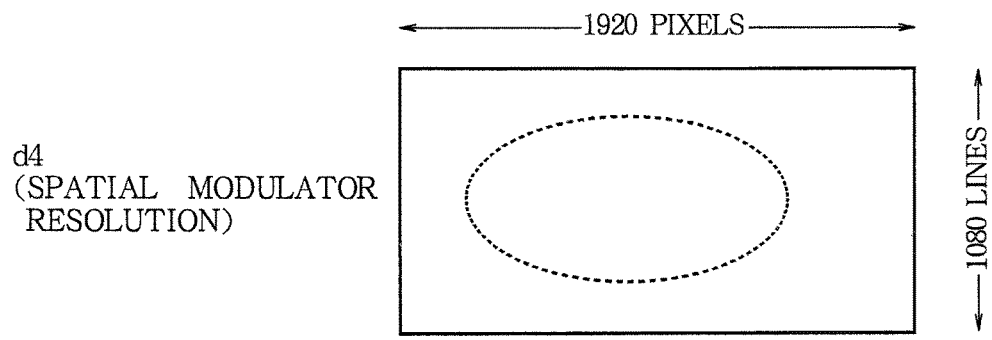

FIGS. 17(a) to 17(c) illustrate changes in image size at different steps in the present embodiment: FIG. 17(a) shows the image size of video signal d1; FIG. 17(b) shows the image size of the video signal d6m after the mask processing; FIG. 17(c) shows the image size of the video signal d4 supplied to the image display unit 62, that is, the size (number of pixels) of the spatial modulator 5.

Suppose, for example, that the right and left images of the video signal d1 output from the receiving unit 1 occupy respective halves of a full-HD (1920 dots×1080 lines) area as shown in FIG. 17(a). In this case, as shown in FIG. 17(b), the video signal d6m read from the frame memory of the signal format converter 4 has a size of 960 dots×540 lines, which is one quarter the size of the video signal d1 (FIG. 17(a)) output from the receiving unit 1.

In this case, the bus bandwidth needed for frame memory access during format conversion is reduced to one-quarter.

As noted earlier, it is necessary to increase the size when the size (number of pixels) of the spatial modulator 5 is the same as the size of the video signal d1 output from the receiving unit 1, as shown in FIG. 17(c).

FIGS. 18(a) to 18(d) illustrate the operation of the frame memory controller 27 according to the present embodiment: FIGS. 18(b) and 18(c) show a video signal d6a as a specific example of the video signal d6 output from the masking section 26 and a mask signal m6a as a specific example of the mask signal m6; FIG. 18(a) shows the horizontal synchronizing signal of video signal d6a; FIG. 18(d) shows the video signal d7 output from the frame memory controller 24.

The operation of the frame memory controller 27 differs from the operations of the frame memory controller 24 in FIGS. 8(a) to 8(d) and FIGS. 9(a) to 9(g) in that the same data are read from the frame memory 23 in two consecutive lines.

As described above, the frame memory controller 27 reads identical data in two consecutive lines, so that it is possible not only to obtain a video signal having the size required for the spatial modulator 5, but also to reduce the bus bandwidth required for frame memory access.

The same effect can be obtained if the frame memory controller 27 reads the video data d6 written in every other line in the frame memory and the same data are written in two consecutive lines in the spatial modulator 5.

An example has been described here in which all data in every other line are masked, but it is possible to reduce the frame memory access bus bandwidth further by performing mask processing on a plurality of consecutive lines.

Fifth Embodiment

Figure 19:
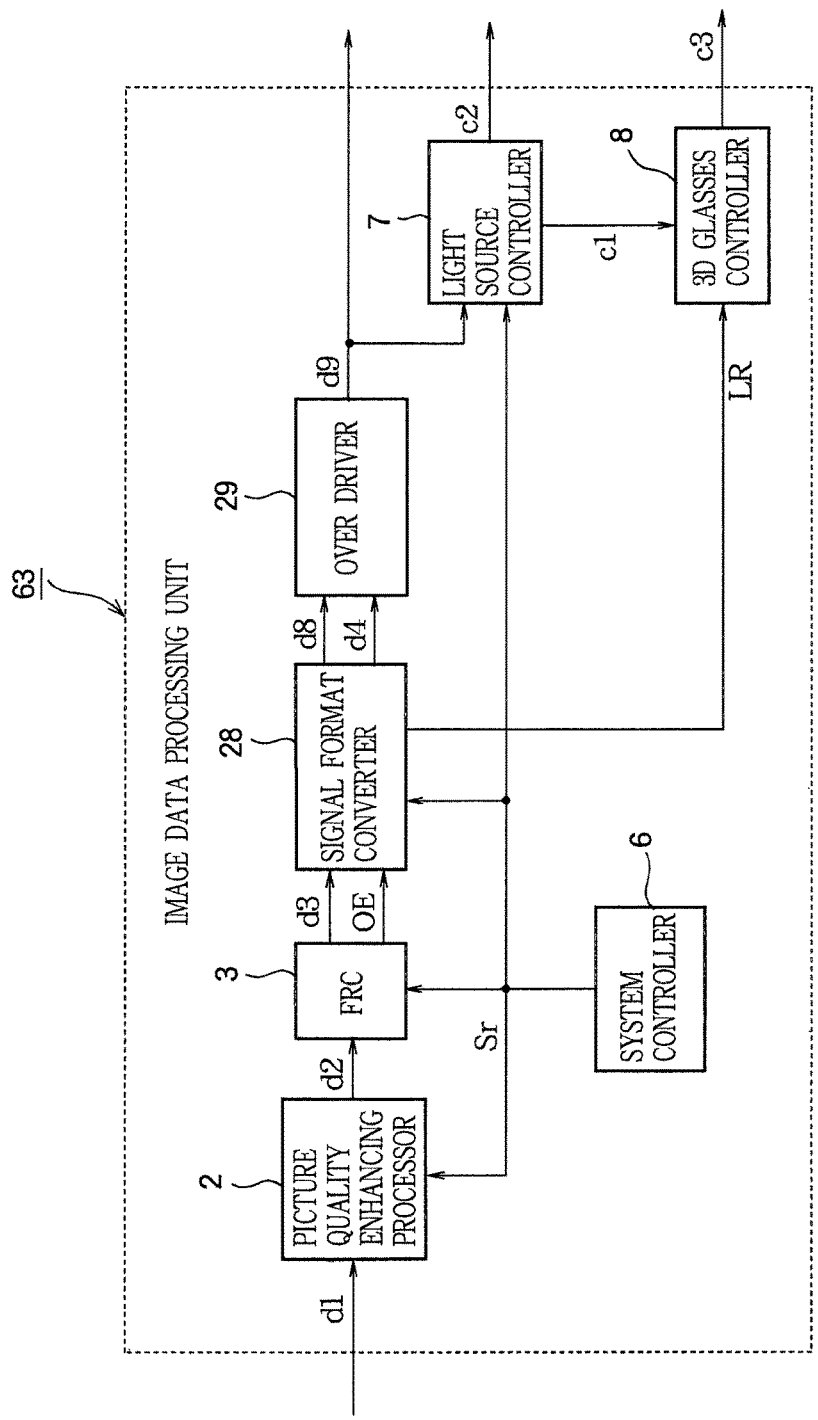
FIG. 19 is a block diagram showing an example of the image data processing unit according to a fifth embodiment of the invention.

The overall structure of the image display apparatus in the fifth embodiment is the same as described in the first embodiment with reference to FIG. 1, but the image data processing unit 61 in FIG. 1 is replaced with the image data processing unit 63 shown in FIG. 19.

The image data processing unit 63 shown in FIG. 19 is generally the same as the image data processing unit 61 shown in FIG. 1, but the signal format converter 4 in FIG. 1 is replaced with another signal format converter 28 and an over driver 29 is added.

The video signal d1 output from the receiving unit 1 is input to the picture quality enhancing processor 2. The picture quality enhancing processor 2 performs so-called picture quality enhancement processing, such as edge enhancement and color correction, on the video signal d1 output from the receiving unit 1 on the basis of control information Sr sent from the system controller 6 and outputs a video signal d2.

The video signal d2 output from the picture quality enhancing processor 2 is input to the FRC 3. The FRC 3 converts the frame rate of video signal d2 on the basis of the control information Sr sent from the system controller 6 and outputs video signal d3 to the signal format converter 28.

The FRC 3 also generates the sub-frame flag OE and outputs it to the signal format converter 28.

On the basis of the control information Sr sent from the system controller 6 and the video signal d3 and sub-frame flag OE input from the FRC 3, the signal format converter 28 converts the pixel sequence of the input video signal d3 and outputs the resulting video signals d4, d8 to the over driver 29. The video signal d4 is of a current frame, while the video signal d8 is a video signal one frame before, i.e., of an immediately preceding frame.

The signal format converter 28 also generates a selection control signal LR on the basis of the sub-frame flag OE input from the FRC 3 and outputs the selection control signal LR to the 3D glasses controller 8.

On the basis of the video signals d4, d8 output from the signal format converter 28, the over driver 29 generates, and outputs to the image display unit 62 and light source controller 7, a video signal d9 representing the gradation values of each pixels of the image, which correspond to voltages to be applied to the liquid crystals of the liquid crystal panels 15.

On the basis of the video signal d9 output from the over driver 29 and the control information Sr sent from the system controller 6, the light source controller 7 generates a light source control signal c2 for turning the light source used for image display on and off and outputs the light source control signal c2 to the image display unit 62. The light source controller 7 also generates a timing signal c1, based on the timing at which the light source is turned on and off, and outputs the timing signal c1 to the 3D glasses controller 8.

On the basis of the selection control signal LR output from the signal format converter 28 and the timing signal c1 output from the light source controller 7, the 3D glasses controller 8 generates a 3D glasses control signal c3 to control the shutters of 3D glasses 64. Specifically, the 3D glasses controller 8 controls separate transmissive liquid crystal shutters 64R, 64L built into the 3D glasses 64 for the right and left eyes so as to switch the transmission of light to the right eye only or to the left eye only.

Figure 20:
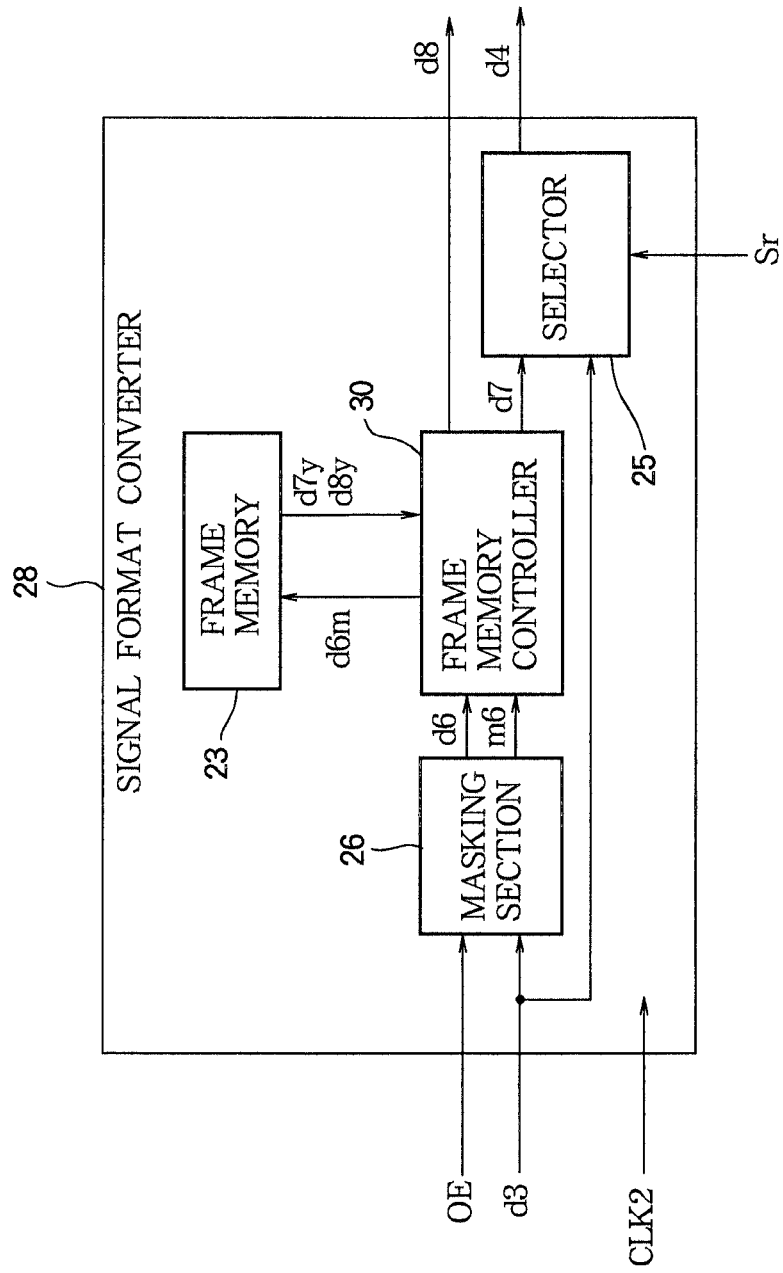
FIG. 20 is a block diagram showing an example of the signal format converter 28 in FIG. 19, FIGS. 21(a) to 21(o) illustrate the operation of the signal format converter 28 in FIG. 20.

FIG. 20 is a block diagram showing details of the signal format converter 28 in the present embodiment. The difference from the signal format converter 4 in FIG. 12 is that the frame memory controller 27 in FIG. 12 is replaced with a frame memory controller 30. The frame memory controller 30 is generally the same as the frame memory controller 27, but operates differently; in particular, it outputs another video signal d8 in addition to video signal d7.

The video signal d3 and sub-frame flag OE output from the FRC 3 are input to the masking section 26.

When the input video signal d3 is a 3D video signal, the masking section 26 generates a mask signal m6 on the basis of the sub-frame flag OE and outputs it to the frame memory controller 30 together with video signal d6.

The frame memory controller 30 generates memory addresses, based on the synchronizing signals included in the input video signal d6. The memory addresses are generated, however, only while the mask signal m6 is Lo. When the input video signal d3 is a 3D video signal, accordingly, the video signal d6 input to the frame memory controller 30 is written into the frame memory 23 after alternate selection of only the right image data or only the left image data in each frame.

Accordingly, the bus bandwidth required for writing to the frame memory is half the bus bandwidth required when the input video signal d6 is a normal video signal (non-3D display signal).

The frame memory controller 30 also reads the video signal stored in the frame memory 23.

When reading, the frame memory controller 30 operates differently depending on whether the input video signal d6 is a 3D video signal or not.

When the video signal d6 input to the frame memory controller 30 is a 3D display signal, the frame memory controller 30 simultaneously reads the video signals d7, d8 of two consecutive frames stored in the frame memory 23.

The video signal d8 output from the frame memory controller 30 is input to the over driver 29.

The video signal d7 output from the frame memory controller 30 is input to the selector 25. When 3D mode processing is specified by the control information Sr sent from the system controller 6, the selector 25 outputs the video signal d7 output from the frame memory controller 24 as video signal d4.

When the video signal d6 input to the frame memory controller 30 is a normal video signal (non-3D video signal), the frame memory controller 30 reads only the video data d8 stored in the frame memory 23 one frame before. In this case, the masking section 26 does not mask the video signal stored in the frame memory 23 (accordingly, sub-sampling is not performed), so the video signal has twice as much data as a 3D video signal.

Since only the data of one frame are read from the frame memory 23, however, the amount of bus bandwidth required for reading is the same as required to read the data of two frames when a 3D video signal is input.

During normal processing (non-3D mode), the selector 25 outputs the input video signal d3 as video signal d4.

In this way, the signal format converter 28 effectively delays the video signal d3 by one frame, and outputs the delayed signal d8 (signal of an immediately preceding frame), as well as the undelayed signal d4 (signal of a current frame), both in the 3D mode and in the normal mode.

Figure 21:
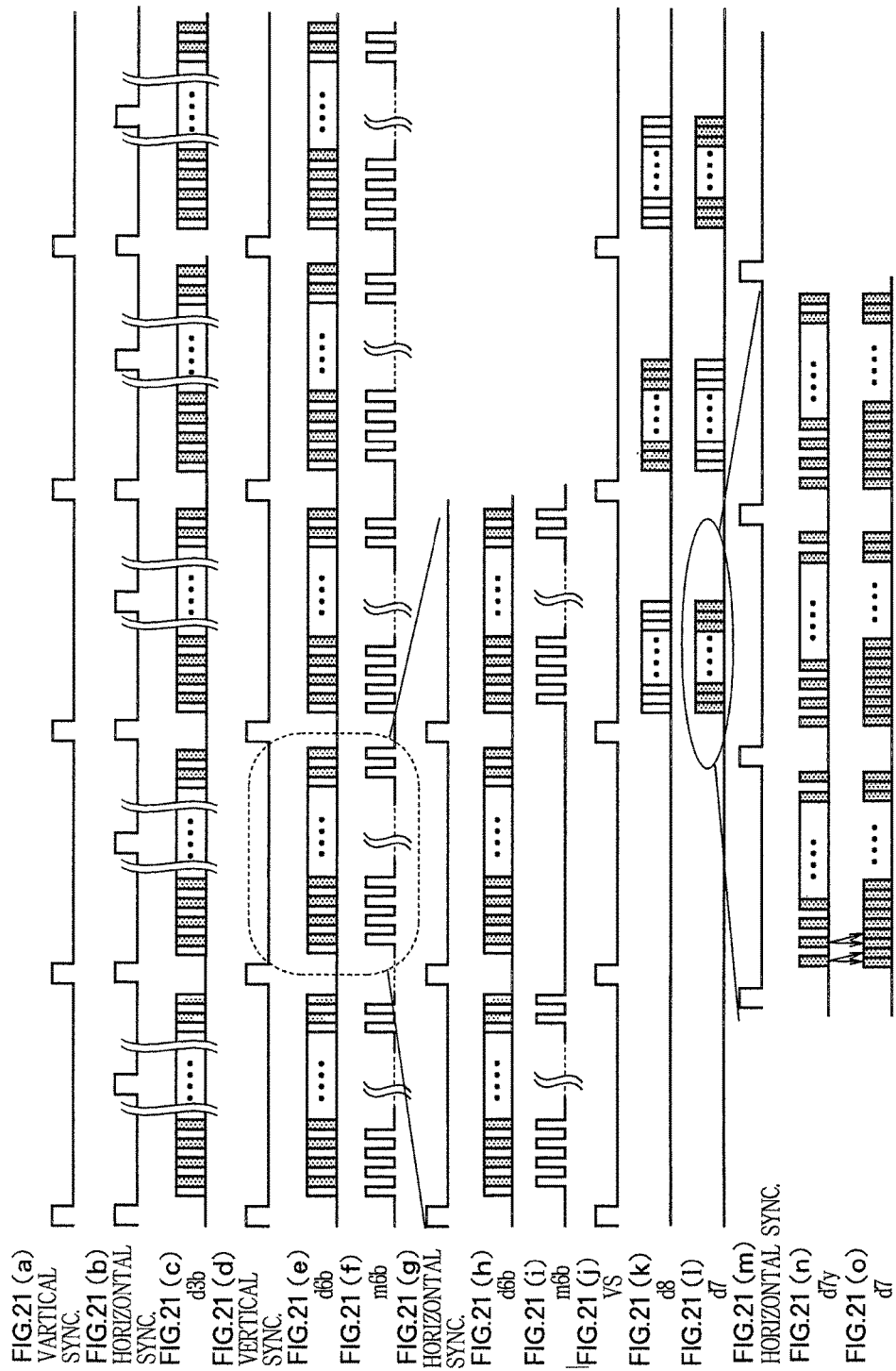

FIGS. 21(a) to 21(o) illustrate the operation of the signal format converter 28: FIG. 21(c) shows a video signal d3b as a specific example of the video signal d3 input to the signal format converter 28; FIGS. 21(a) and 21(b) show the vertical synchronizing signal and horizontal synchronizing signal of signal d3b; FIGS. 21(e) and 21(f) show a video signal d6b as a specific example of the video signal d6 output from the masking section 26 and a mask signal m6b as a specific example of the mask signal m6; FIGS. 21(h) and 21(i) show the video signal d6b and the mask signal m6b in FIGS. 21(e) and 21(f) enlarged in the time axis direction; FIG. 21(d) shows the vertical synchronizing signal of the video signal d6b in FIG. 21(e); FIG. 21(g) shows the horizontal synchronizing signal of the video signal d6b in FIG. 21(h); FIGS. 21(k) and 21(l) show the video signals d8 and d7 output from the frame memory controller 30; FIG. 21(j) shows the vertical synchronizing signal VS of video signals d8 and d7; FIG. 21(o) shows video signal d7 in FIG. 21(l) enlarged in the time axis direction; FIG. 21(n) shows the video signal d7y output from the frame memory 23, drawn on the same time axis scale as in FIG. 21(o); FIG. 21(m) shows the horizontal synchronizing signal of the video signal d7y in FIG. 21(n).

The video signal d3 received by the signal format converter 28 is input to the masking section 26.

When, as in the video signal d3b shown in FIG. 21(c), for example, video signal d3 includes right image data and left image data in alternate pixels and the order of the right image data and left image data in each horizontal line (which of the right image data and the left image data appears first in each line) changes at every horizontal line, the masking section 26 generates, as the mask signal m6, a mask signal m6b (FIG. 21(f), FIG. 21(i)) that selects the right and left image data intervals in the video signal d3b alternately at every frame so that the right image data intervals are selected in every other frame, while the left image data intervals are selected in the frames between these every other frames, and outputs it to the frame memory controller 30 together with the image data d6b (FIG. 21(e), FIG. 21(h)).

The frame memory controller 30 generates memory addresses from the synchronizing signals included in the input video signal d6b. The memory addresses are generated, however, only while the mask signal m6b is Lo. Accordingly, only the right image data or only the left image data in the video signal d6b input to the frame memory controller 30 are selected in alternate frames and written into the frame memory 23.

The frame memory controller 30 also reads the video signal stored in the frame memory 23.

The frame memory controller 30 reads the video signal d6b of at least two consecutive frames stored in the frame memory 23, reading two frames at a time.

Specifically, the video signal d7y of the current frame (FIG. 21(n)) and the video signal d8y one frame before are read simultaneously from the frame memory 23.

The video signal d7y and video signal d8y each have half as many data as input video signal d3b.

By a zero-order hold, the frame memory controller 30 outputs the video signal d7y read from the frame memory 23 repeatedly over two pixels, thereby generating a video signal d7 (FIG. 21(l), FIG. 21(o)) having the same amount of data as the input video signal d3b. In addition, by a zero-order hold, the frame memory controller 30 outputs the video signal d8y read from the frame memory 23 repeatedly over two pixels, thereby generating a video signal d8 (FIG. 21(k)) having the same data amount as the input video signal d3b.

Figure 22:
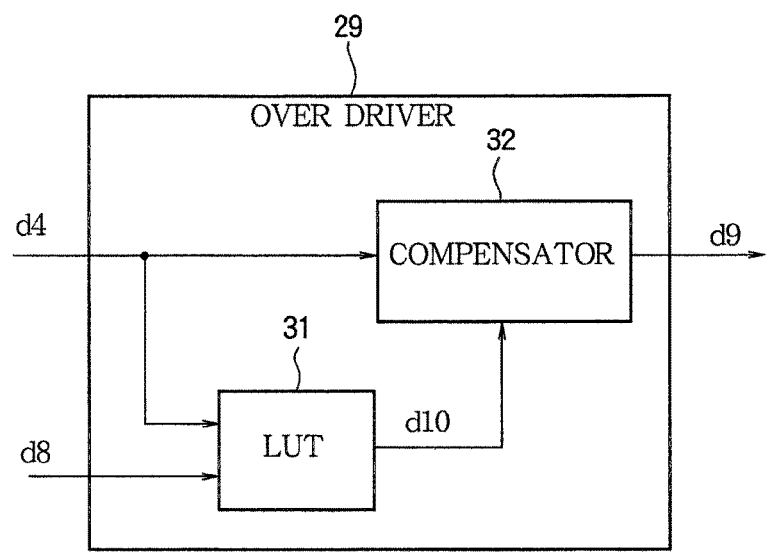
FIG. 22 is a block diagram showing an example of the over driver 29 in FIG. 19.

FIG. 22 is a block diagram showing an exemplary internal structure of the over driver 29. The over driver 29 comprises a look-up table 31 and a compensator 32. The video signals d4, d8 output from the frame memory controller 30 are input to the look-up table 31. The video signal d4 is also input to the compensator 32.

The look-up table 31 outputs a compensation quantity d10, based on both the value of the video signal d4 of the current frame and the value of the video signal d8 one frame before.

Figure 23:
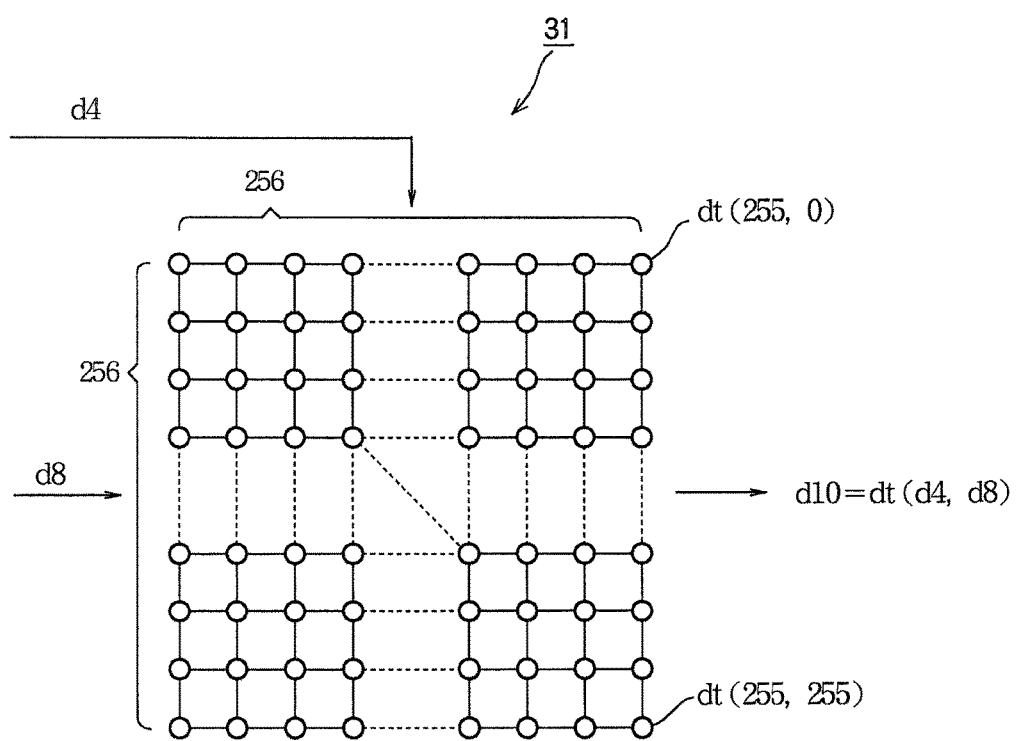
FIG. 23 shows an exemplary structure of the look-up table in FIG. 22.

FIG. 23 is a schematic diagram showing an exemplary structure of the look-up table 31. The look-up table 31 receives, as a read address, the values of the video signal d4 in the current frame and the video signal d8 one frame before. If the video signal d4 in the current frame and the video signal d8 one frame before both have eight-bit image data, the look-up table 31 store 256×256 sets of data as compensation quantities d10. The look-up table 31 reads and outputs the compensation quantity d10=dt(d4, d8) corresponding to the values of the video signal d4 in the current frame and the video signal d8 one frame before.

The compensator 32 adds the compensation quantity d10 output from the look-up table 31 to the current frame video signal d4 and outputs compensated image data d9.

As described above, even when a 3D video signal is input, it is possible to improve the response time of a liquid crystal panel by reading the current frame video signal and the video signal one frame before simultaneously during signal format conversion, generating a video signal representing the gradation value of each pixel, corresponding to the voltage to be applied to the liquid crystal panel, based on the values of the current frame video signal and the video signal one frame before, and then driving the liquid crystal panel.

In addition, when a 3D video signal is input, it is possible to hold the frame memory bus bandwidth down by generating a mask signal in advance, before signal format conversion, and writing the video signal into the frame memory on the basis of the mask signal.

Furthermore, when a normal video signal is input (a 3D video signal is not input), the video signal input to the signal format converter can be selected as the current frame video signal, whereby the frame memory bus bandwidth can be kept down.

As a result of keeping the frame memory bus bandwidth down, power can also be conserved.

What is claimed is:

1. An 3D video system comprising:
    a frame rate converter having a rate conversion frame memory and configured to store an input video signal in the rate conversion frame memory, then read and output the input video signal at a doubled clock rate;
    a signal format converter configured to convert a pixel sequence of the video signal output from the frame rate converter and output the converted video signal;
    a controller configured to output a timing signal, based on the video signal output from the signal format converter;
    3D glasses configured to transmit light alternately to left and right eyes, and switch the transmission of the light to the left and right eyes, based on the video signal output from the signal format converter and the timing signal output from the controller; and
    a spatial modulator configured to spatially modulate light emitted from a light source, based on the video signal output from the signal format converter;
    wherein when the input video signal is a 3D video signal, the 3D video system enables the light that has been modulated in the spatial modulator to be viewed stereoscopically.

2. The 3D video system of claim 1, further comprising a picture quality enhancing processor configured to perform a filtering process on the input video signal, wherein:
    when the input video signal is a 3D video signal in which a right image and a left image coexist in a single frame, the picture quality enhancing processor filters data of the right image and data of the left image separately; and
    after storing the video signal filtered in the picture quality enhancing processor in the rate conversion frame memory, the frame rate converter reads and outputs the video signal stored in the rate conversion frame memory at clock rate twice that of the video signal filtered in the picture quality enhancing processor.

3. The 3D video system of claim 1, wherein when the input video signal is a 3D video signal in which a right image and a left image coexist in a single frame, the frame rate converter repeatedly outputs an identical image over two consecutive frames.

4. The 3D video system of claim 3, wherein when the input video signal is a 3D video signal in which a right image and a left image coexist in a single frame, the signal format converter outputs a video signal comprising only the right image and a video signal comprising only the left image in alternate frames.

5. The 3D video system of claim 4, wherein the signal format converter has a format conversion frame memory for storing the input video signal and, when the input video signal is a 3D video signal in which a right image and a left image coexist in a single frame, stores the video signal comprising only the right image and the video signal comprising only the left image in the alternate frames into the format conversion frame memory.

6. The 3D video system of claim 5, wherein if the input video signal is a 3D video signal in which a right image and a left image coexist in a single frame, when the signal format converter reads and outputs the video signal stored in the format conversion frame memory, the signal format converter places identical image signals in two horizontally consecutive pixels.

7. The 3D video system of claim 5, wherein if the input video signal is a 3D video signal in which a right image and a left image coexist in a single frame, the signal format converter stores video images in the format conversion frame memory in alternate lines and, when reading and outputting the video signal stored in the format conversion frame memory, places identical image signals in two vertically consecutive lines.

8. The 3D video system of claim 1, wherein if the input video signal is a 3D video signal in which a right image and a left image coexist in a single frame, the controller controls the light source in synchronization with the video signal output from the signal format converter so as to turn on when a predetermined time has elapsed from termination of a video signal interval of each frame of the video signal output from the signal format converter and to turn off simultaneously with a start of the video signal interval of each frame of the video signal output from the signal format converter starts.

9. The 3D video system of claim 8, wherein the predetermined time is set to a value longer than a response time of the spatial modulator.

10. The 3D video system of claim 1, further comprising an over driver configured to generate a video signal representing a gradation value of each pixel of an image, corresponding to a voltage to be applied to a liquid crystal panel, from data of the video signal in two consecutive frames, wherein:
    when the input video signal is a 3D video signal in which a right image and a left image coexist in a single frame, the signal format converter outputs a video signal comprising only the right image and a video signal comprising only the left image in alternate frames as a current frame video signal and also outputs a video signal one frame before the current frame video signal; and
    the over driver generates a video signal representing a gradation value of each pixel of an image, corresponding to a voltage to be applied to a liquid crystal panel, based on the current frame video signal and the video signal of an immediately preceding frame which are output from the signal format converter.

11. The 3D video system of claim 10, wherein when the input video signal is a normal video signal:
    the signal format converter delays the video signal output from the frame rate converter by one frame; and the over driver generates a video signal representing the gradation value of each pixel of the image corresponding to the voltage to be applied to a liquid crystal panel, based on the video signal delayed by the signal format converter and the video signal output from the signal format converter.

* * * * *